Oct. 31, 1950 C. G. FLYGARE ET AL 2,527,804
GRINDING MACHINE
Filed Oct. 22, 1947 22 Sheets-Sheet 1

Inventors
CARL G. FLYGARE
CHARLES C. ALVORD
WILLIAM L. DROWN
By Harold W. Eaton
Attorney

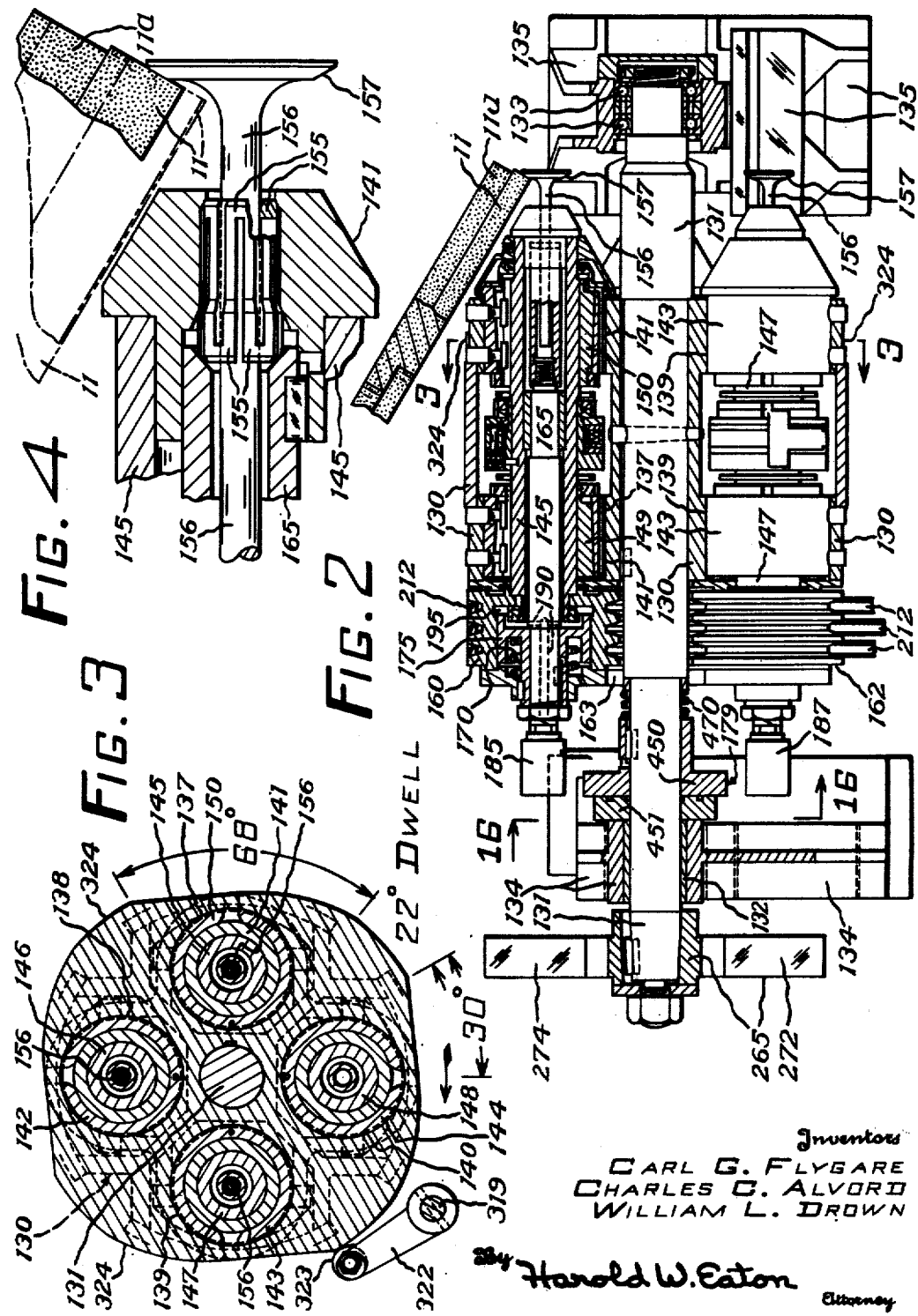

Oct. 31, 1950 C. G. FLYGARE ET AL 2,527,804
GRINDING MACHINE
Filed Oct. 22, 1947 22 Sheets-Sheet 3
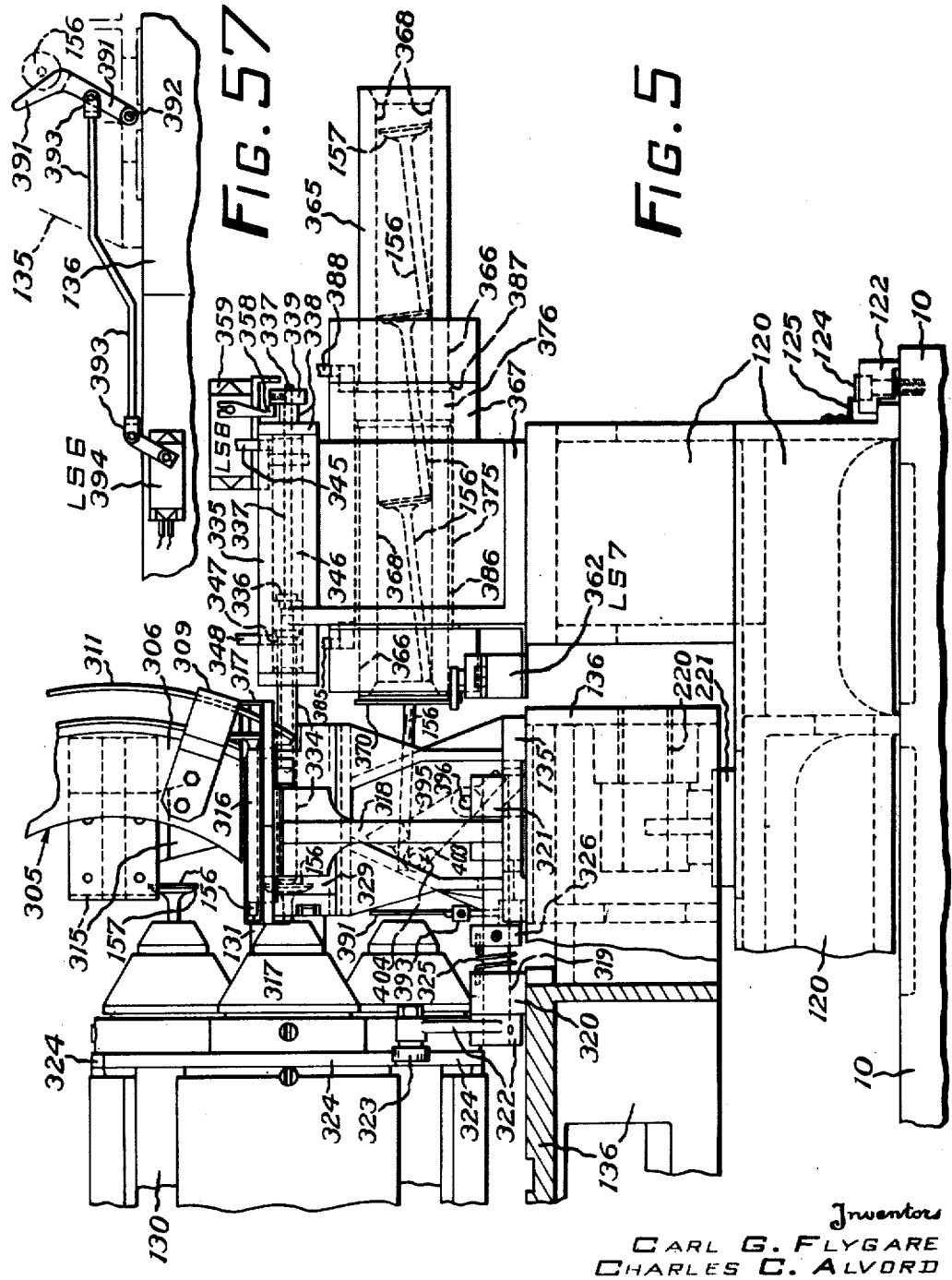
Inventors
CARL G. FLYGARE
CHARLES C. ALVORD
WILLIAM L. DROWN
By Harold W. Eaton
Attorney

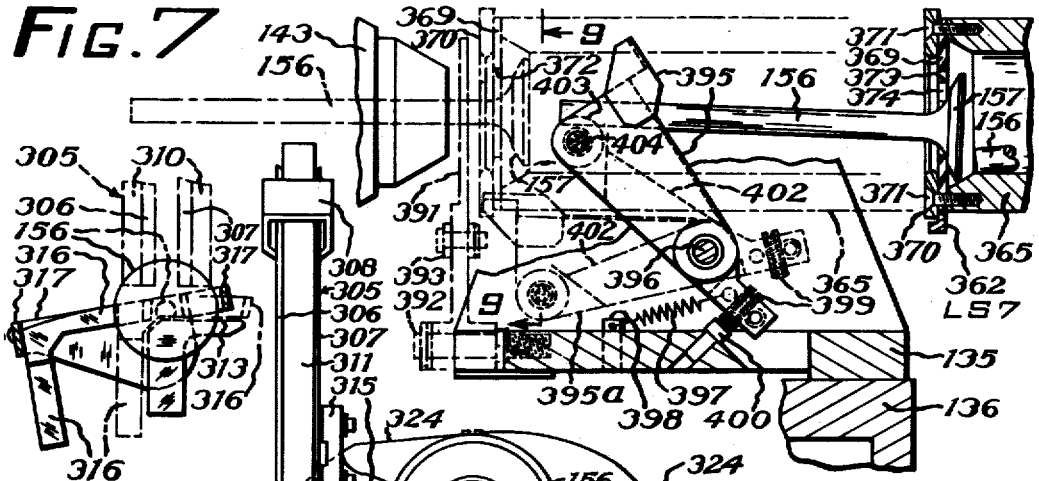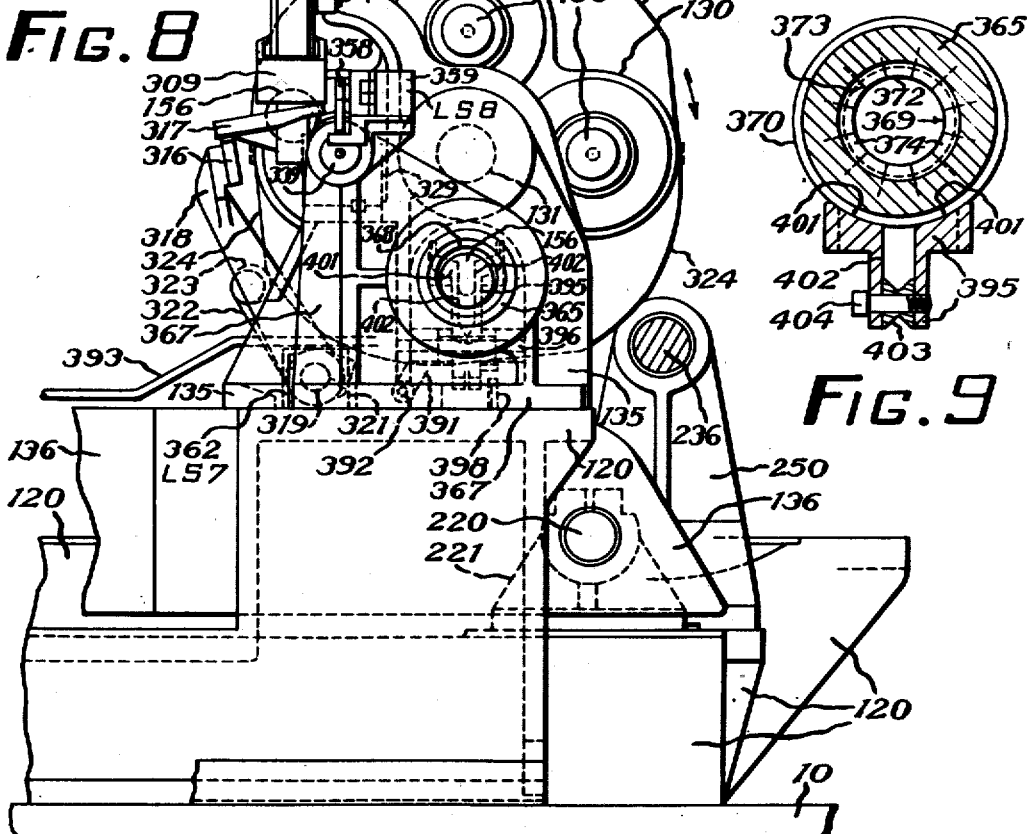

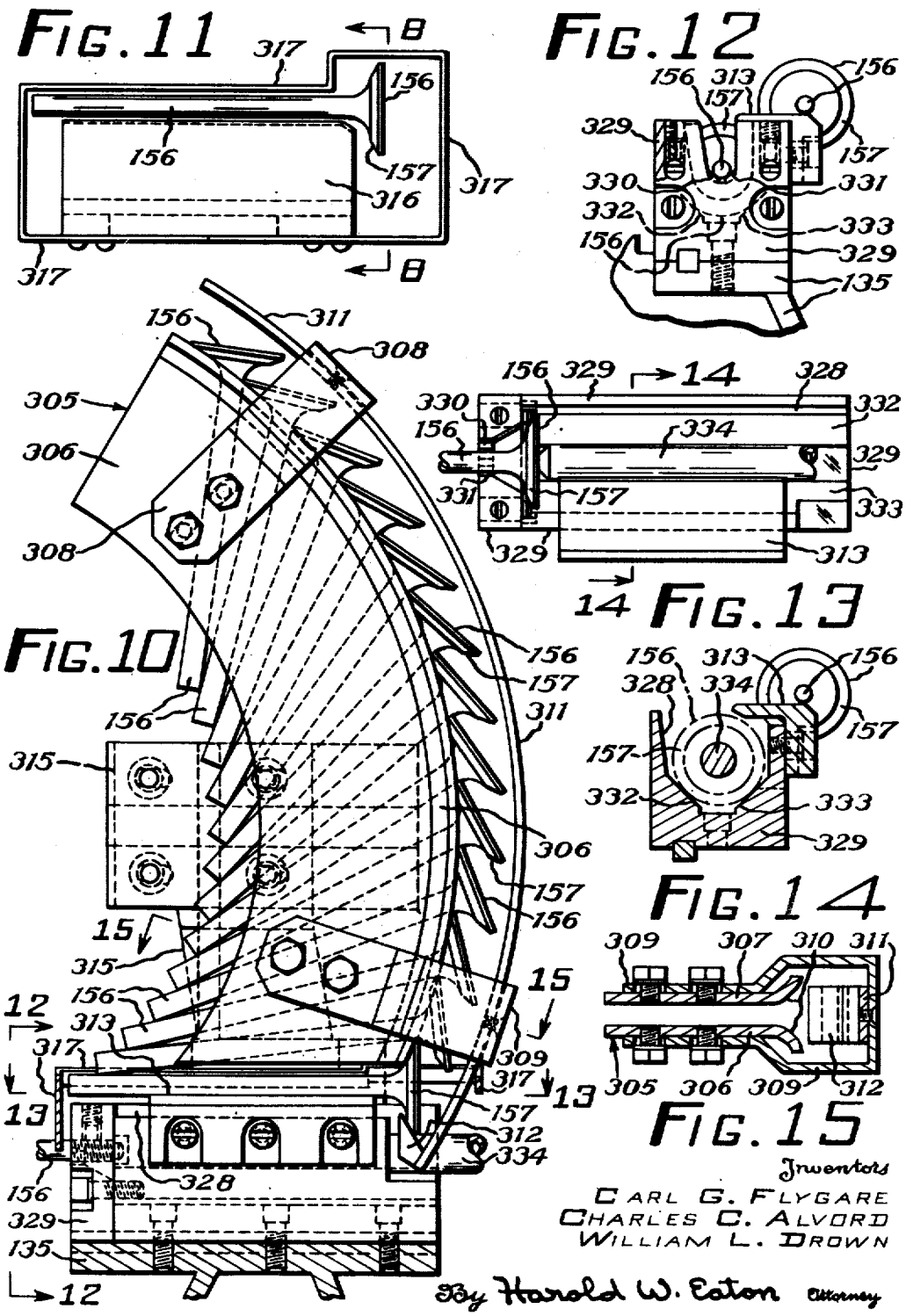

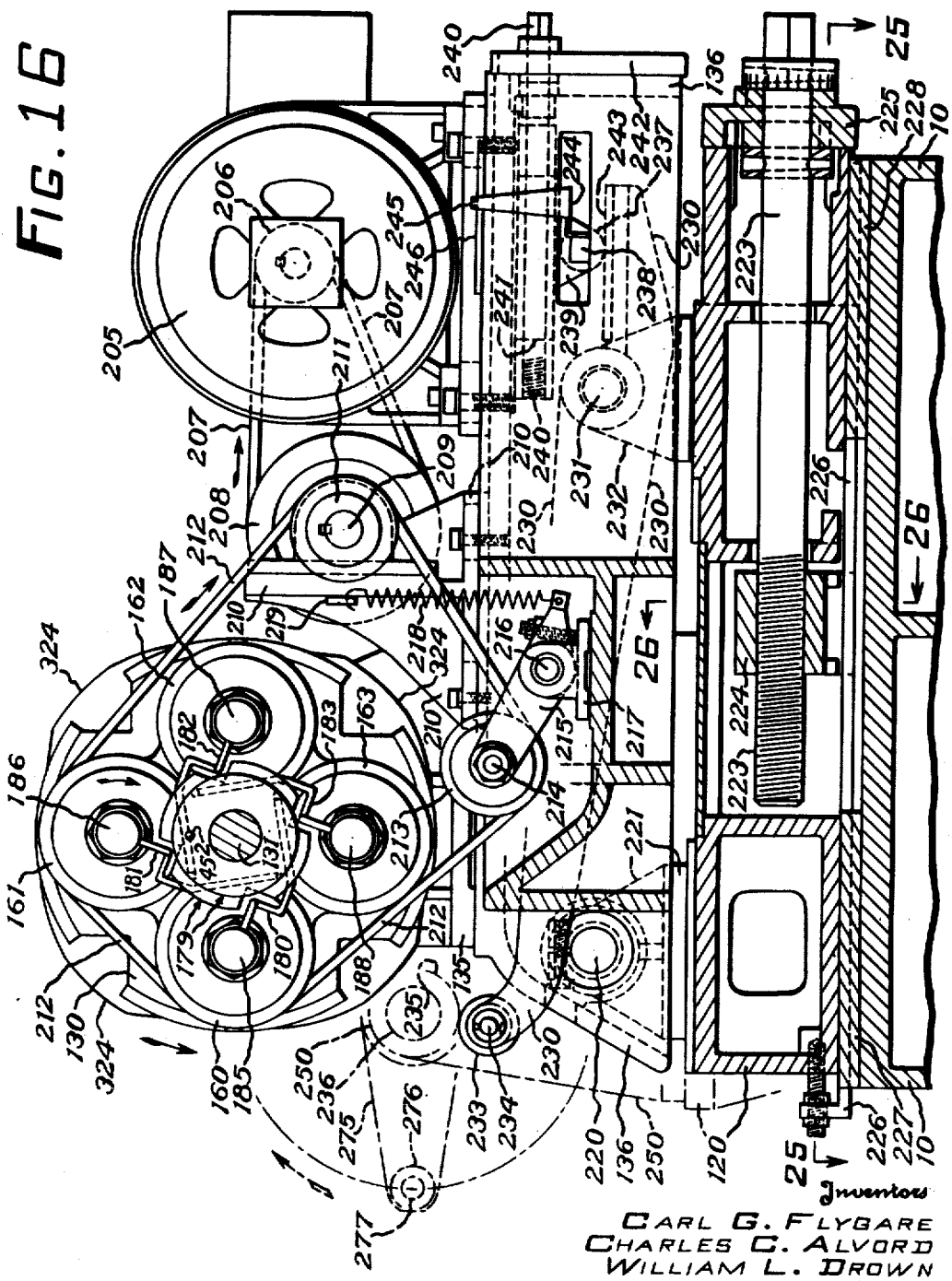

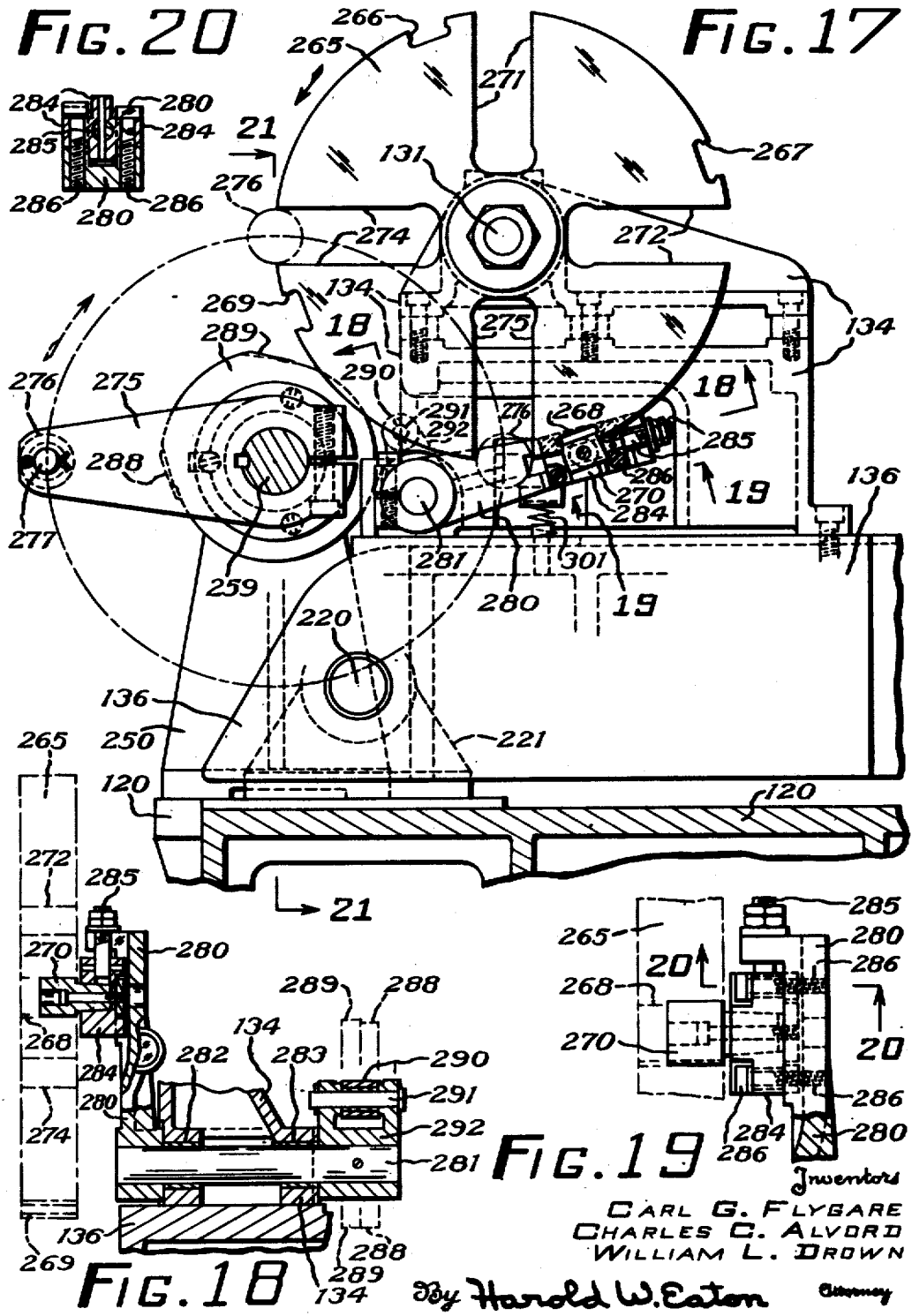

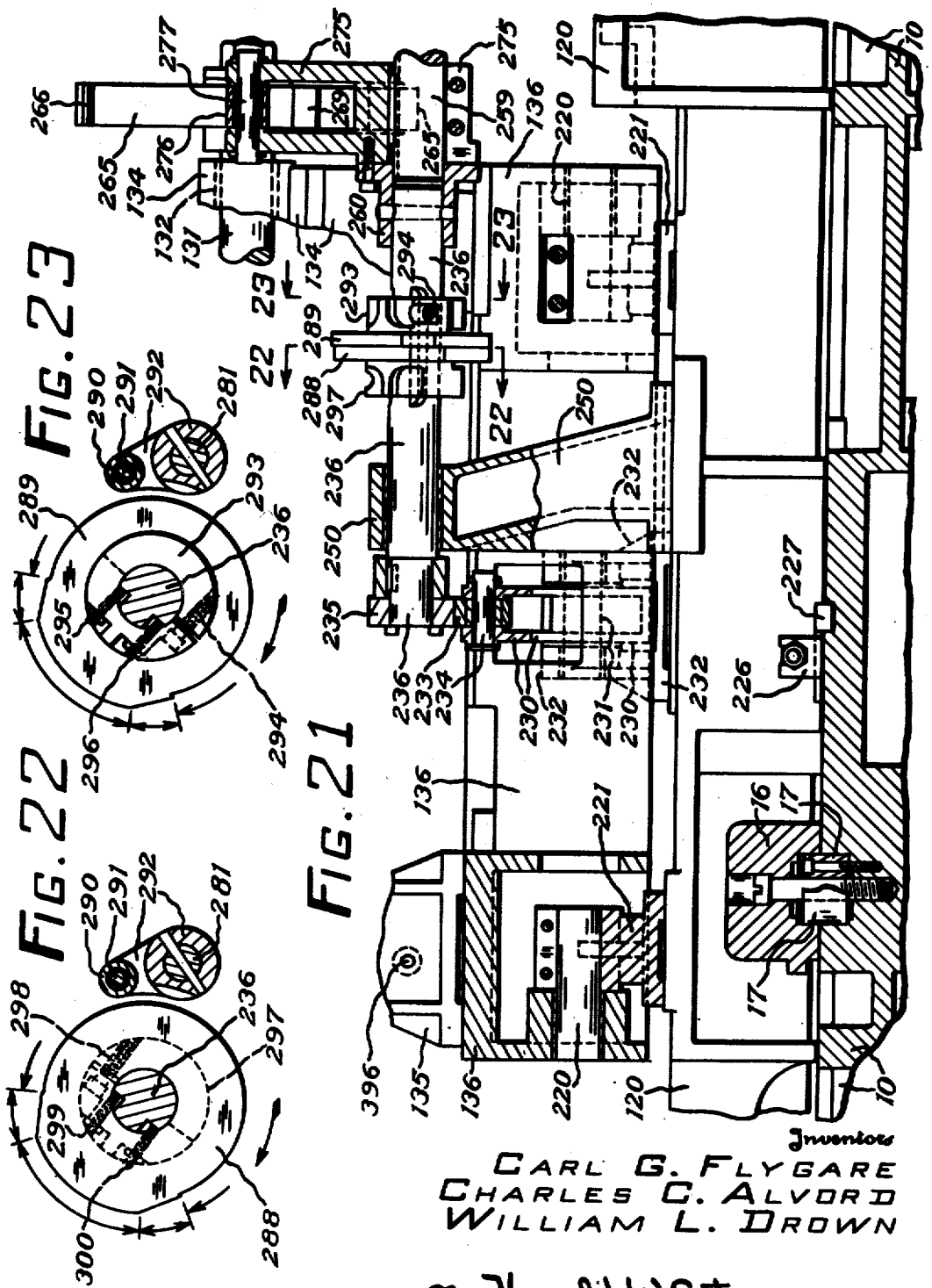

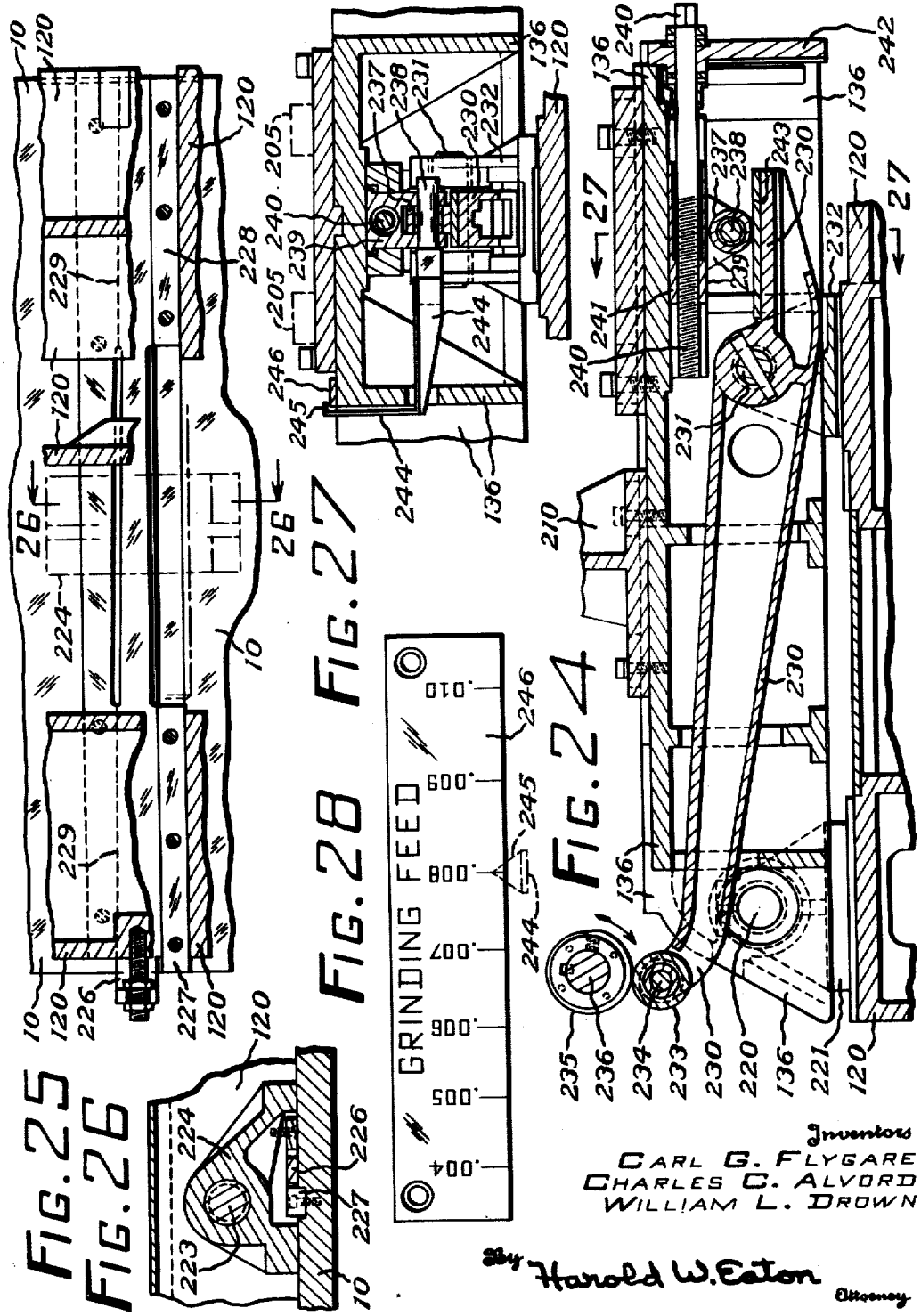

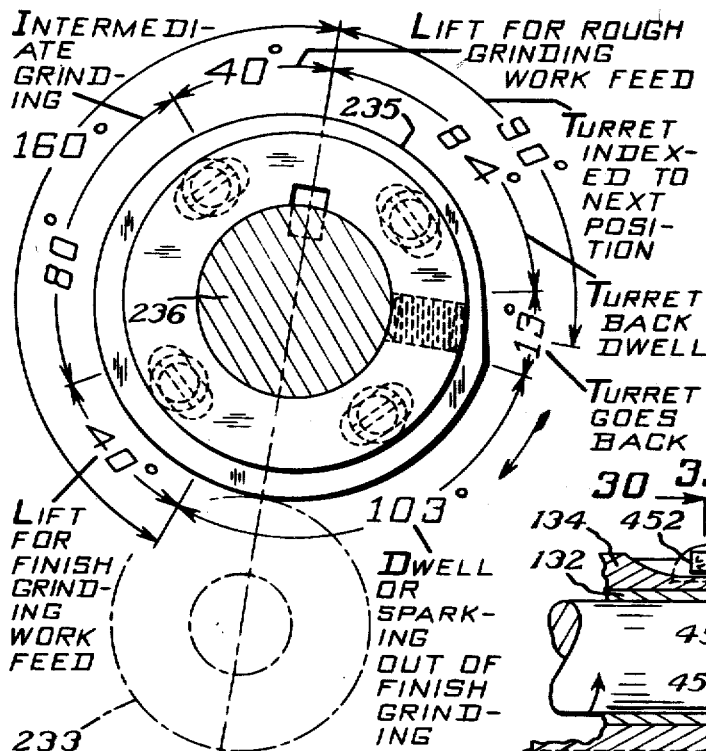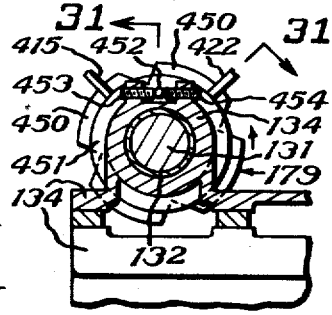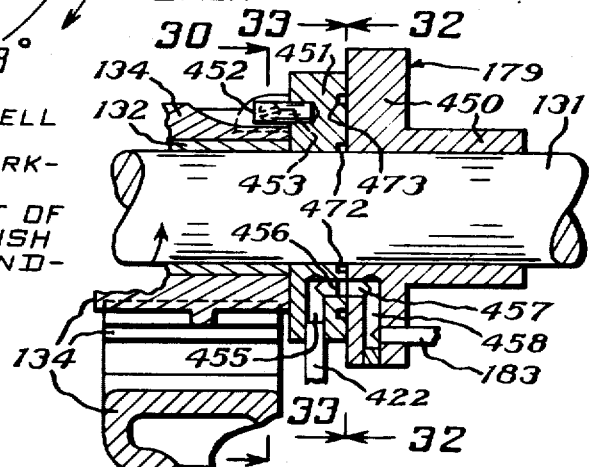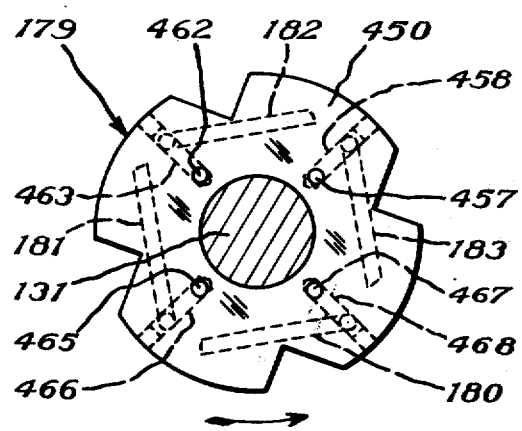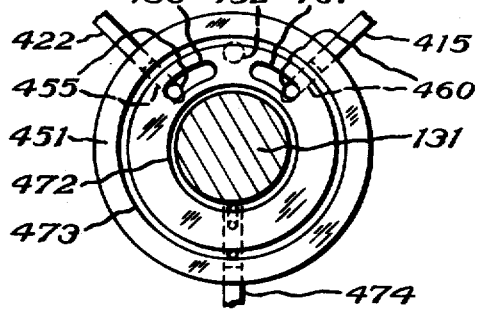

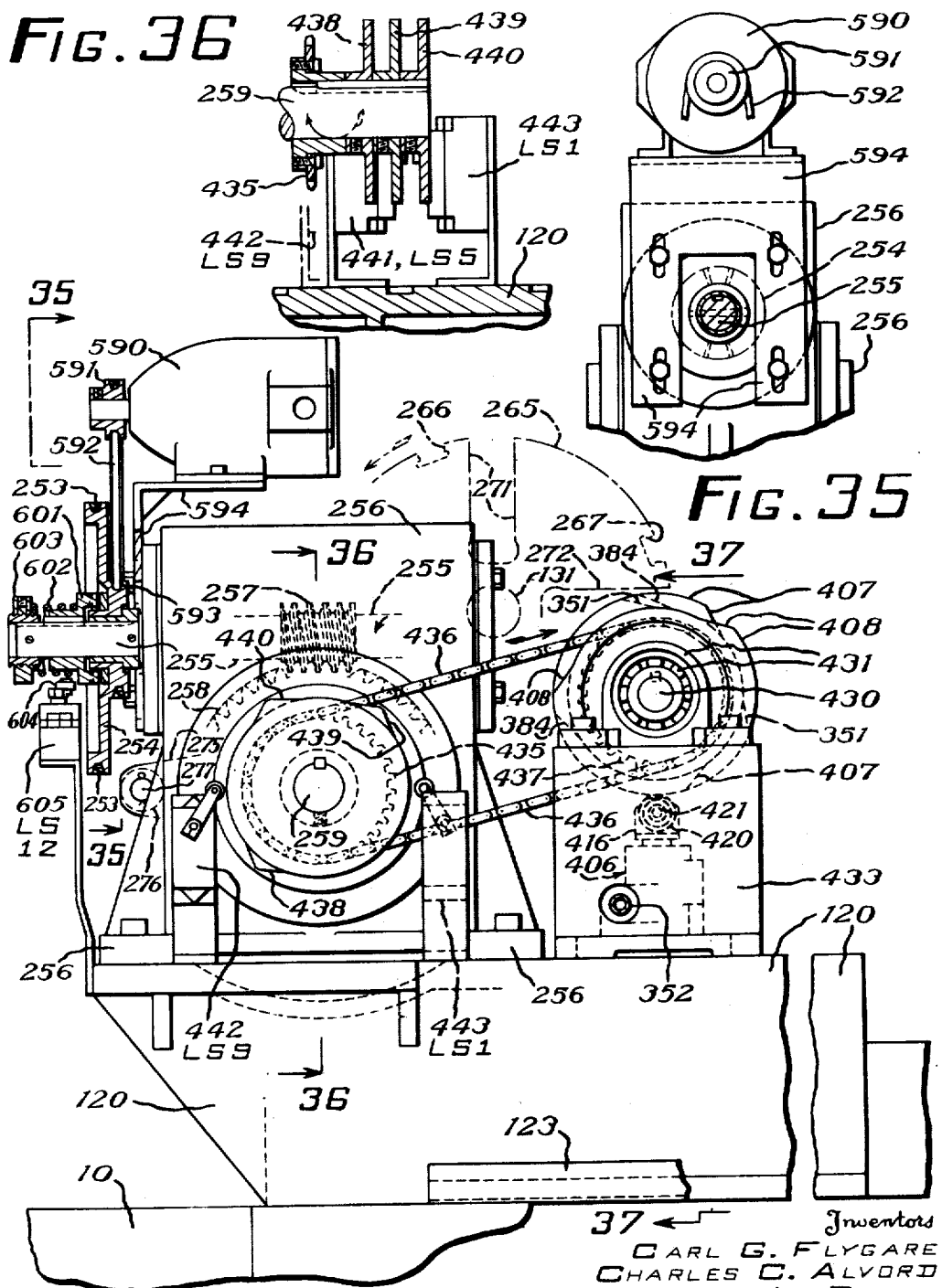

Oct. 31, 1950 C. G. FLYGARE ET AL 2,527,804
GRINDING MACHINE
Filed Oct. 22, 1947 22 Sheets-Sheet 12
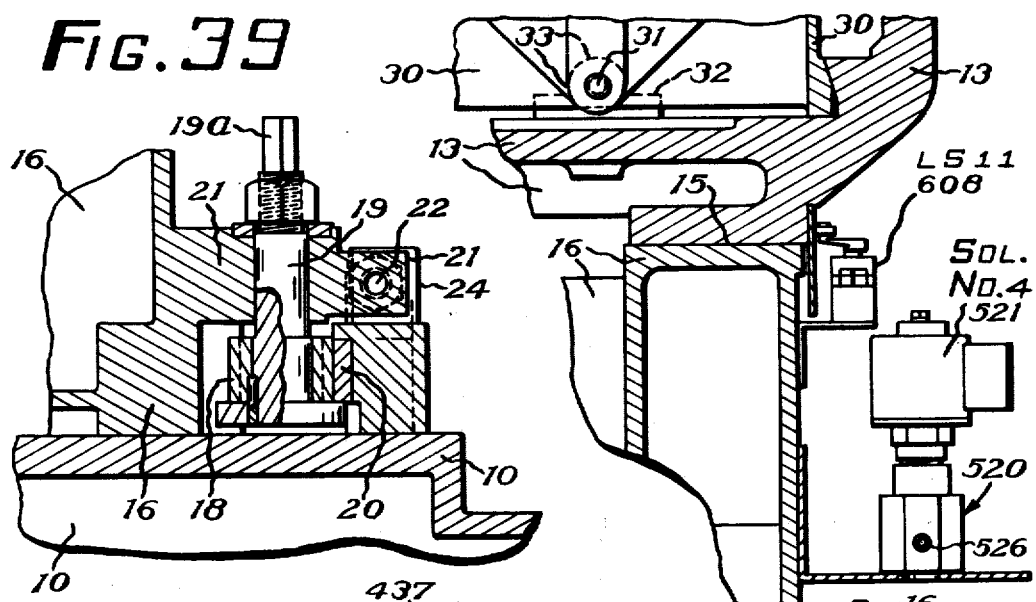
FIG. 39
FIG. 38
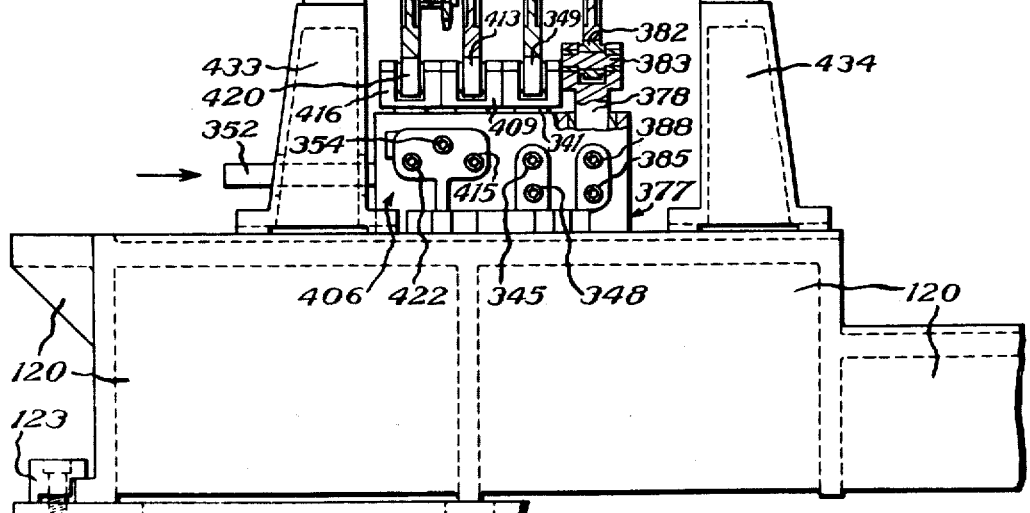
FIG. 37
Inventors
CARL G. FLYGARE
CHARLES C. ALVORD
WILLIAM L. DROWN
By Harold W. Eaton
Attorney

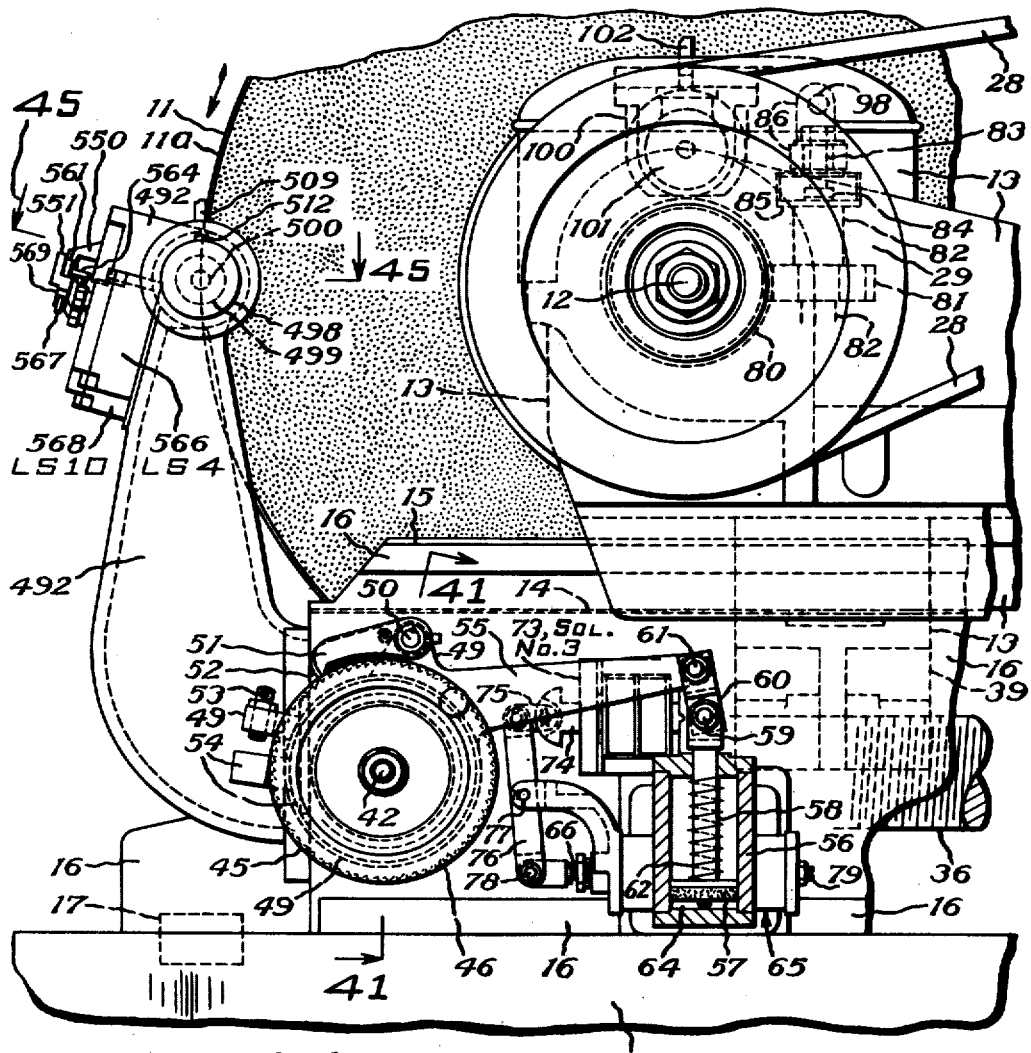
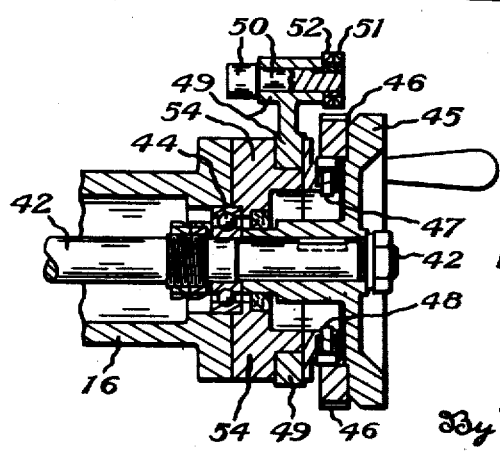
FIG. 40
FIG. 41
Inventors
CARL G. FLYGARE
CHARLES C. ALVORD
WILLIAM L. DROWN
By Harold W. Eaton   Attorney

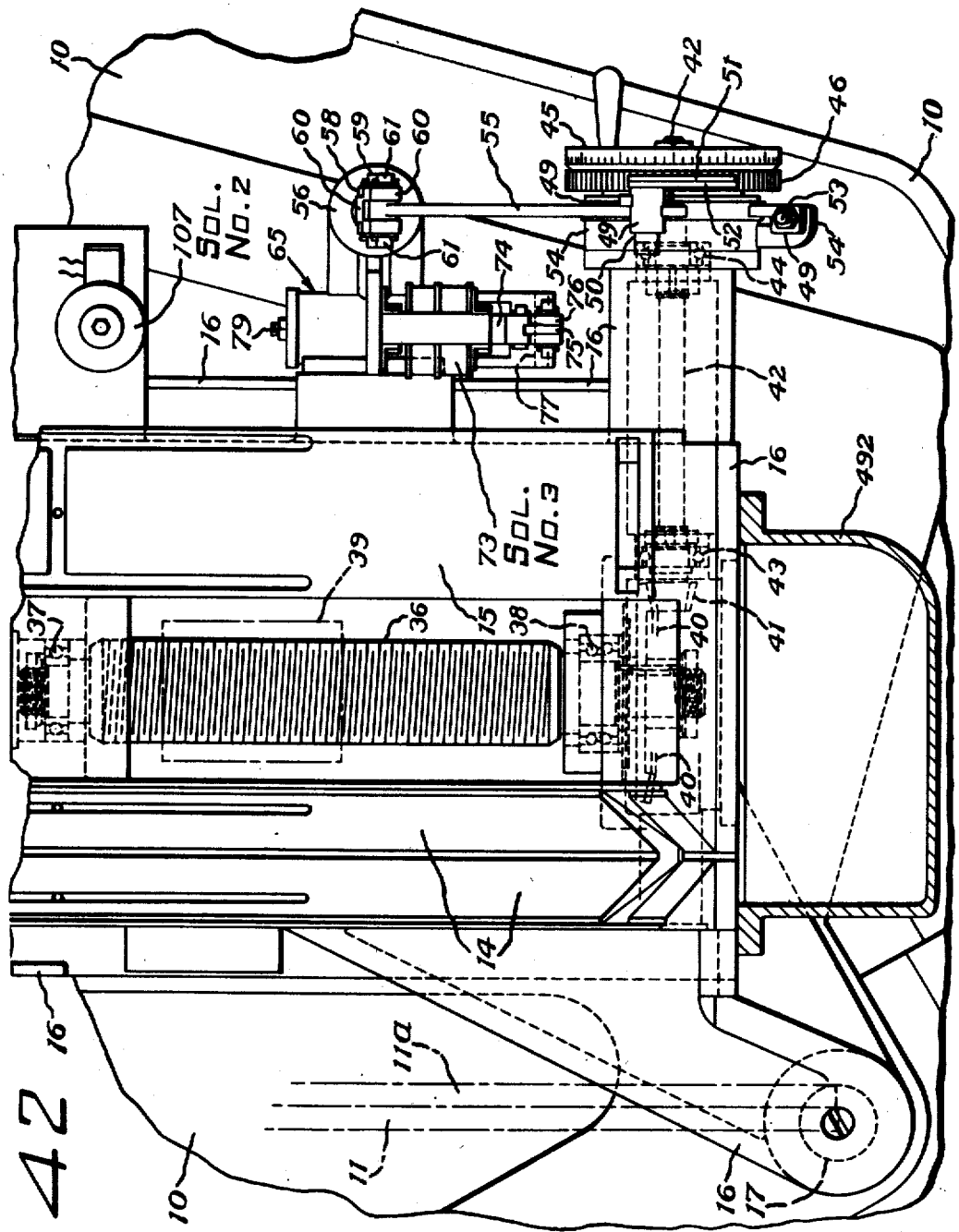

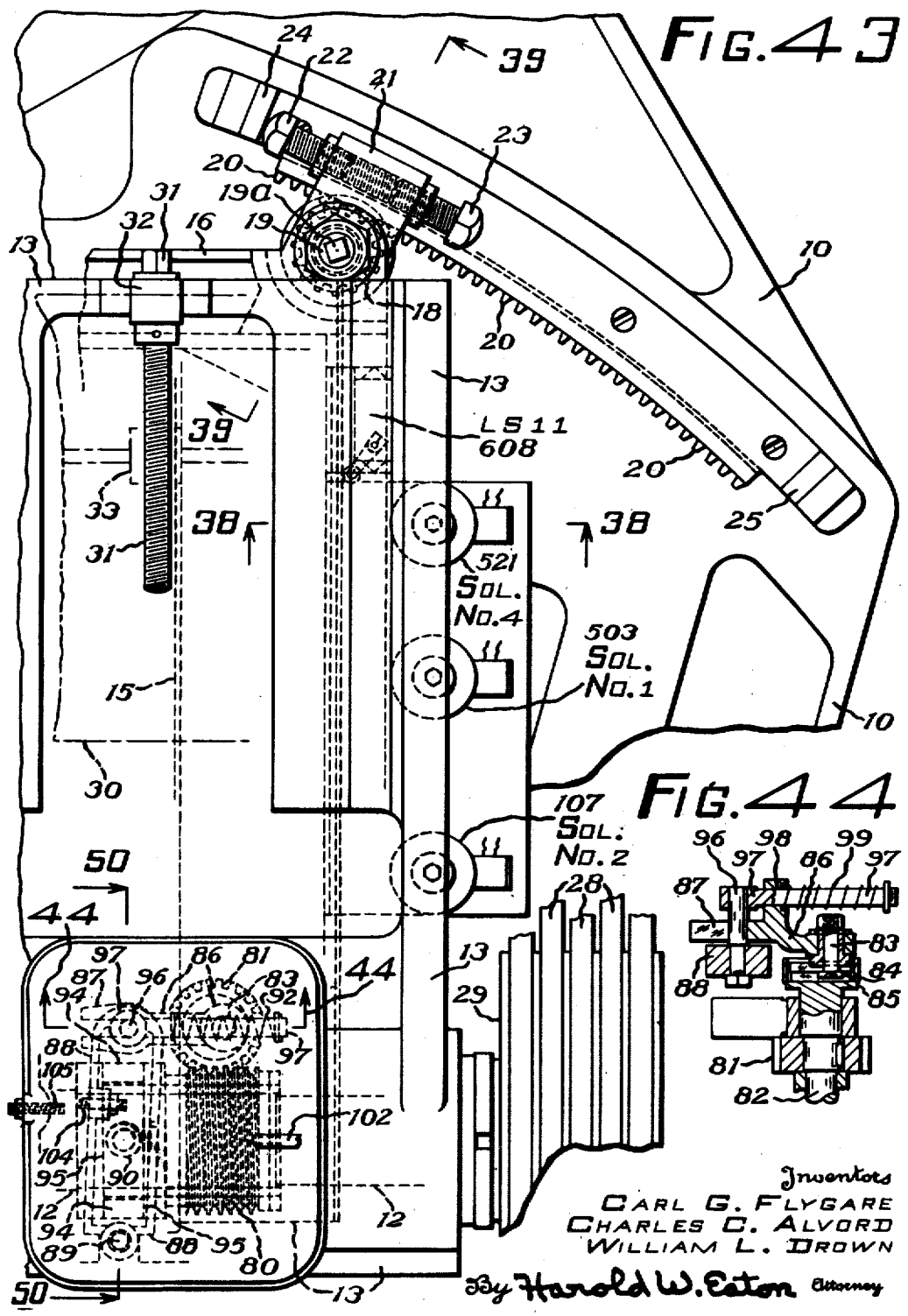

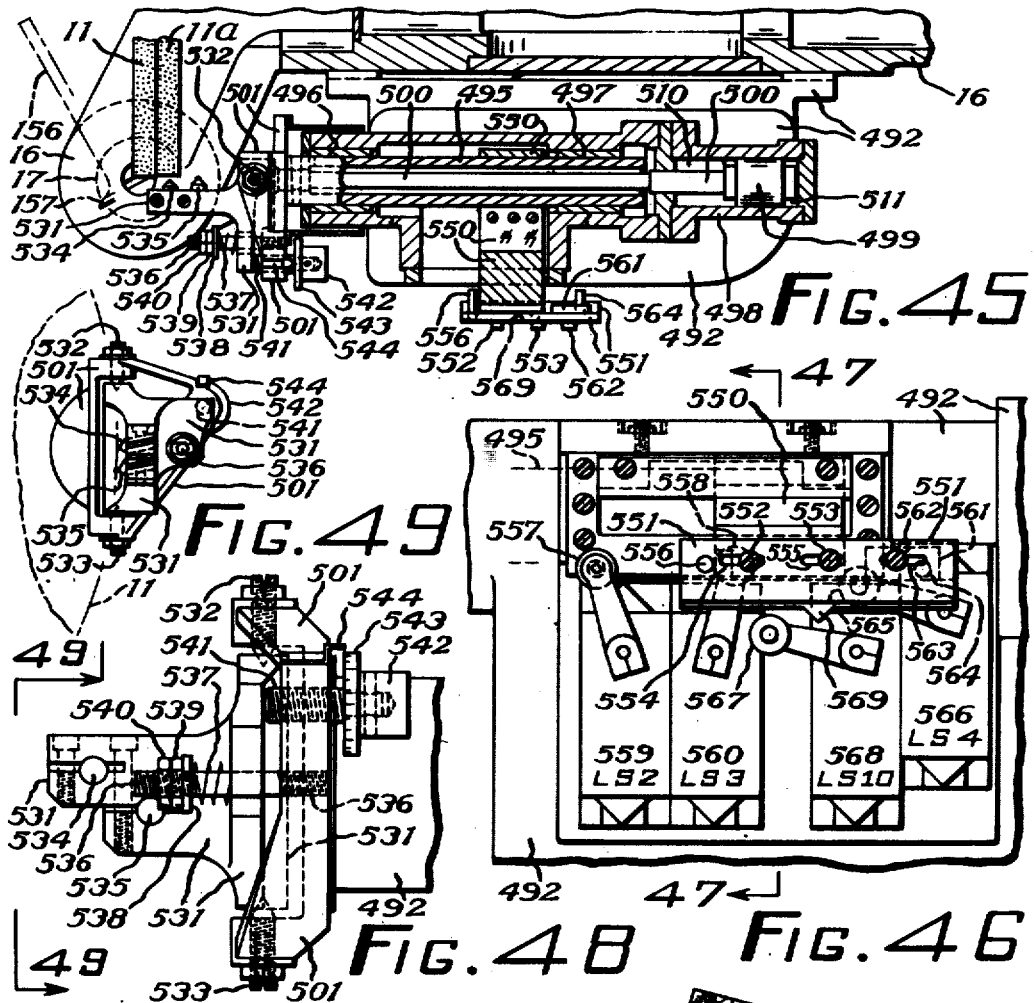
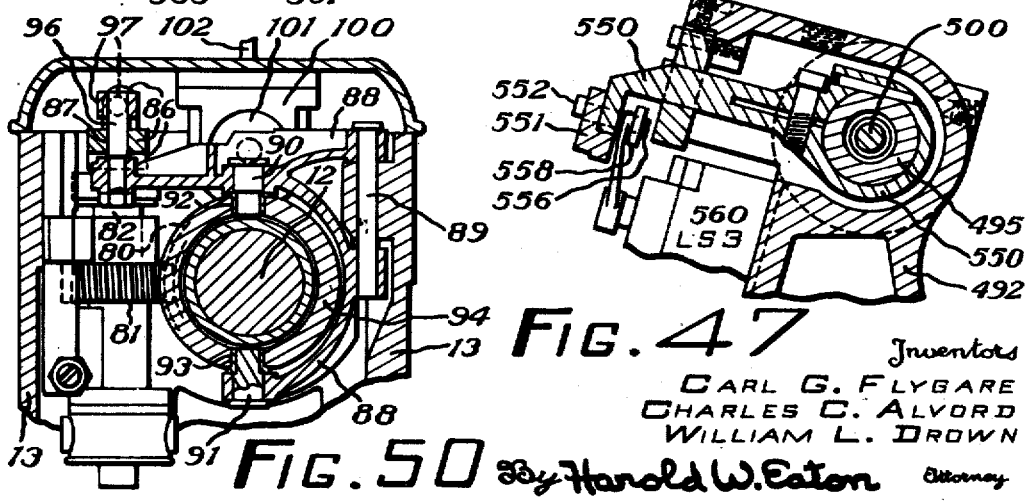

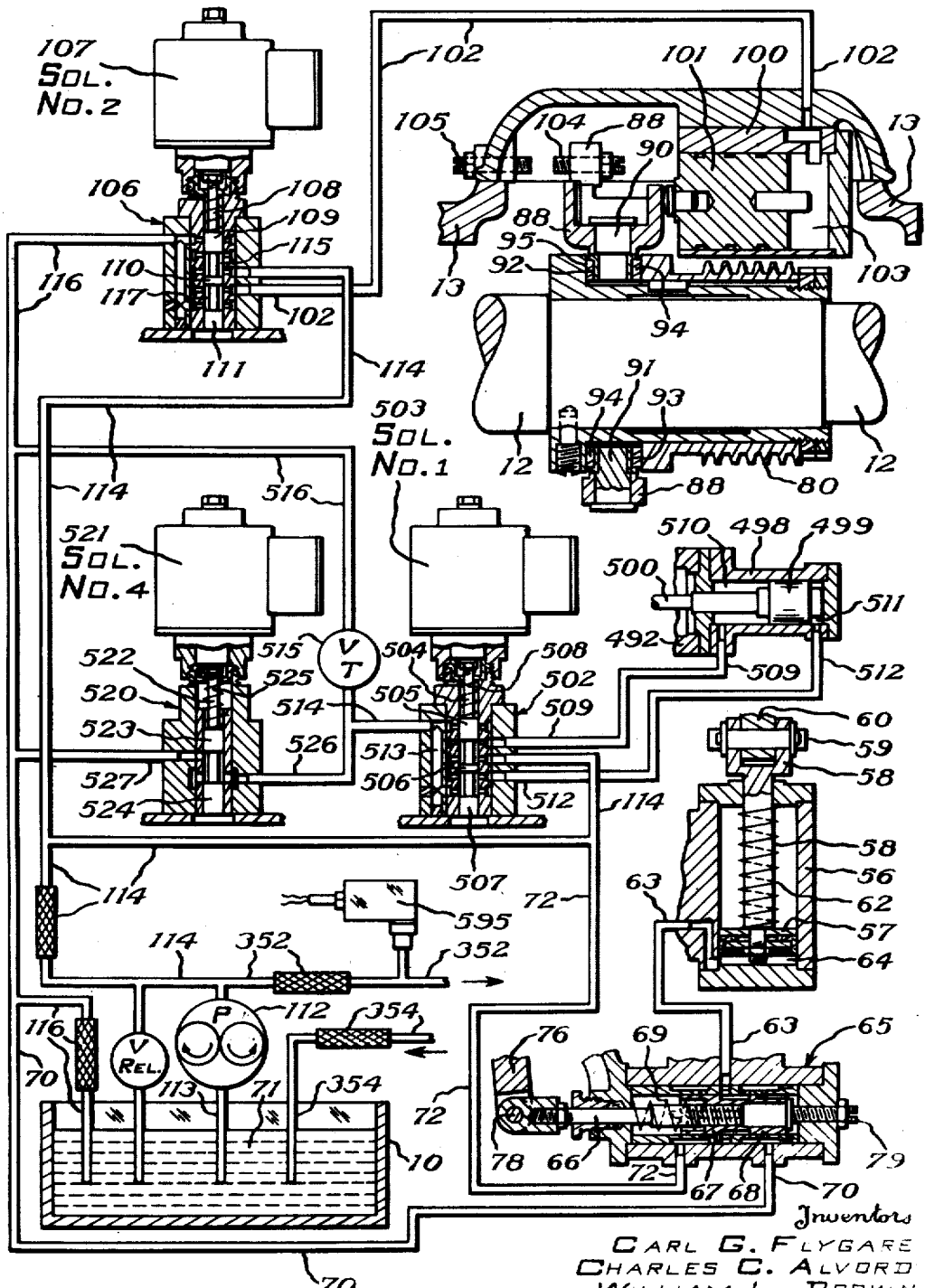

Oct. 31, 1950

C. G. FLYGARE ET AL 2,527,804

GRINDING MACHINE

Filed Oct. 22, 1947

Inventors
CARL G. FLYGARE
CHARLES C. ALVORD
WILLIAM L. DROWN
By Harold W. Eaton
Attorney Patented Oct. 31, 1950

2,527,804

UNITED STATES PATENT OFFICE 2,527,804

GRINDING MACHINE

Carl G. Flygare and Charles C. Alvord, Worcester, and William L. Drown, Paxton, Mass., assignors to Norton Company, Worcester, Mass., a corporation of Massachusetts Application October 22, 1947, Serial No. 781,314

26 Claims. (Cl. 51—108)

1

The invention relates to grinding machines, and more particularly to an automatically operated machine for grinding work pieces such as the frusto-conical faces of automotive valves and the like.

One object of the invention is to provide a simple and thoroughly practical automatically operated grinding machine for successively and automatically grinding a plurality of work pieces. Another object of the invention is to provide an automatic valve grinding machine in which successive valves to be ground are automatically loaded into and discharged from a plurality of work spindles on a turret-type work support. Another object of the invention is to provide a feeding mechanism automatically to feed the work supporting turret transversely toward and from the grinding wheel to grind successive work pieces automatically to a predetermined size.

Another object of the invention is to provide a pivotal support for the work turret and a cam actuated mechanism for rocking the turret so as to impart a transverse relative feeding movement of the work piece toward and from the grinding wheel successively to grind a plurality of work pieces to a predetermined size.

Another object of the invention is to provide an automatically operated grinding wheel truing apparatus which is arranged to true the grinding wheel automatically after a predetermined number of work pieces have been ground.

A further object of the invention is to provide a cycle control mechanism for controlling the indexing movement of the work supporting turret and an automatic actuation of the truing mechanism for truing the grinding wheel after a predetermined number of work pieces have been ground. Another object of the invention is to provide an electrically controlled mechanism actuated by and in timed relation with the cycle control mechanism to initiate an automatic truing cycle after a predetermined number of work pieces have been ground.

Another object of the invention is to provide a traverse control mechanism for the truing tool to facilitate a rapid movement of the truing tool during its idle stroke and an automatic slow-down mechanism for reducing the rapid idle movement of the truing tool to a slow truing speed just before the diamond or truing tool engages the operative face of the grinding wheel.

Another object of the invention is to provide a suitable interlocking of the various mechanisms of the machine so that the work supporting turret cannot be indexed unless a work piece has been completely loaded or until a ground work piece has been completely discharged from the supporting spindles.

A further object of the invention is to provide each of the work spindles with a spring closed collet for supporting and rotating a work piece which is closed by a spring and is opened automatically by fluid under pressure in timed relationship with the indexing movement of the work turret. A further object of the invention is to provide a turret having a plurality of work spindles one of which is located in a grinding position, another in an unloading position, another in a loading position, and a further spindle in an idle position so that each time the work turret is indexed successive spindles are advanced one station so as to facilitate automatic loading and unloading and automatic grinding of a plurality of work pieces. Another object of the invention is to provide a rotary type hydraulic control valve successively to convey fluid under pressure to the work spindle cylinders to unclamp or release the work collets automatically when the work turret is indexed.

Another object of the invention is to provide a feeding mechanism for causing a relative transverse feeding movement between the grinding wheel and work support which is adjustable so that the extent of infeed may be varied without changing the final approaching position of the grinding wheel and work support.

Another object is to provide a feeding mechanism in which a cam actuated mechanism is arranged to rock the work support toward the grinding wheel through an adjustable stroke.

Another object of the invention is to provide a hollow longitudinally reciprocable work discharge sleeve having a slotted flexible annulus at one end which slides over a ground work piece when the sleeve is moved in one direction and grips and ejects the work piece when the sleeve is moved in the other direction. Other objects will be in part obvious or in part pointed out hereinafter.

The invention accordingly consists in the features of construction, combinations of elements and arrangements of parts all as will be exemplified in the structure to be hereinafter described and the scope of the application of which will be indicated in the following claims.

In the accompanying drawings in which is shown one of various possible embodiments of the mechanical features of this invention, Fig. 1 is a plan view of the automatic valve grinding machine;

Fig. 2 is a horizontal sectional view, on an enlarged scale, through the work spindle turret;

Fig. 3 is a cross sectional view, taken approximately on the line 3—3 of Fig. 2, through the work spindle turret;

Fig. 4 is a fragmentary horizontal sectional view, on an enlarged scale, through one of the work supporting chucks or collets showing the relative positions of the valve to be ground and the grinding wheel;

Fig. 5 is a fragmentary left end elevation, on an enlarged scale, showing the work spindle turret, the work loading and the work discharge mechanism;

Fig. 6 is a fragmentary front end elevation, on an enlarged scale, showing the work turret and loading mechanism;

Fig. 7 is a fragmentary horizontal sectional view, on an enlarged scale, of the work discharge mechanism;

Fig. 8 is a fragmentary front elevation, partly in section, taken approximately on the line 8—8 of Fig. 11, of the work loading mechanism.

Fig. 9 is a cross sectional view, taken approximately on the line 9—9 of Fig. 7, through the work discharge mechanism;

Fig. 10 is a fragmentary left end elevation, on an enlarged scale, of the work loading chute and associated mechanism;

Fig. 11 is a fragmentary plan view of the work loader with the work chute removed;

Fig. 12 is a fragmentary end elevation of the work loader taken approximately on the line 12—12 of Fig. 10;

Fig. 13 is a fragmentary plan view, taken approximately on the line 13—13 of Fig. 10;

Fig. 14 is a cross sectional view, taken approximately on the line 14—14 of Fig. 13;

Fig. 15 is a cross sectional view, taken approximately on the line 15—15 of Fig. 10, through the work hopper;

Fig. 16 is a vertical sectional view, taken approximately on the line 16—16 of Fig. 2 showing the work spindle driving mechanism in elevation;

Fig. 17 is a fragmentary sectional view, on an enlarged scale, showing the work spindle turret indexing mechanism;

Fig. 18 is a fragmentary sectional view through the turret indexing mechanism, taken approximately on the line 18—18 of Fig. 17;

Fig. 19 is a fragmentary detail view, on an enlarged scale, taken approximately on the line 19—19 of Fig. 17;

Fig. 20 is a cross sectional detail view, taken approximately on the line 20—20 of Fig. 19;

Fig. 21 is a fragmentary vertical sectional view, taken approximately on the line 21—21 of Fig. 17, through the work turret indexing mechanism;

Fig. 22 is a cross sectional view, on an enlarged scale, taken approximately on the line 22—22 of Fig. 21;

Fig. 23 is a cross sectional view, on an enlarged scale, taken approximately on the line 23—23 of Fig. 21;

Fig. 24 is a cross sectional view, on an enlarged scale, through the work turret feeding mechanism;

Fig. 25 is a horizontal sectional view through the slide supporting the work turret, taken approximately on the line 25—25 of Fig. 16;

Fig. 26 is a fragmentary cross sectional view, taken approximately on the line 26—26 of Fig. 25;

Fig. 27 is a cross sectional view, taken approximately on the line 27—27 of Fig. 24;

Fig. 28 is a fragmentary plan view, on an enlarged scale, of the calibrated scale for indicating grinding feed;

Fig. 29 is an enlarged detail view of the work turret feed cam;

Fig. 30 is a cross sectional view, on a reduced scale, taken approximately on the line 30—30 of Fig. 31, showing the master pilot valve assembly;

Fig. 31 is a vertical sectional view, on an enlarged scale, taken approximately on the line 31—31 of Fig. 30, through the master pilot valve;

Fig. 32 is a cross sectional view, taken approximately on the line 32—32 of Fig. 31, through the master pilot valve;

Fig. 33 is a cross sectional view, taken approximately on the line 33—33 of Fig. 31, through the master pilot valve;

Fig. 34 is a fragmentary left hand end elevation, on an enlarged scale, of the motor-driven cam-actuated control valve mechanism;

Fig. 35 is a fragmentary vertical sectional view, taken approximately on the line 35—35 of Fig. 34, showing the support for the plugging switch;

Fig. 36 is a fragmentary vertical sectional view, taken approximately on the line 36—36 of Fig. 34;

Fig. 37 is a vertical sectional view, partly in elevation, taken approximately on the line 37—37 of Fig. 34, showing the control valves and the actuating cams therefor;

Fig. 38 is a fragmentary vertical sectional view, on an enlarged scale, taken approximately on the line 38—38 of Fig. 43, through a portion of the wheel head unit;

Fig. 39 is a fragmentary vertical sectional view, taken approximately on the line 39—39 of Fig. 43, through the swivel adjusting mechanism for the wheel head unit;

Fig. 40 is a fragmentary right hand end elevation, on an enlarged scale, of the grinding wheel head unit;

Fig. 41 is a sectional view, on an enlarged scale, taken approximately on the line 41—41 of Fig. 40, through the manually operable feed wheel;

Fig. 42 is a fragmentary plan view, on an enlarged scale, of the grinding wheel head unit with the wheel slide removed;

Fig. 43 is a fragmentary plan view, on an enlarged scale, of the grinding wheel head unit showing the swivel adjusting mechanism;

Fig. 44 is a vertical sectional view, taken approximately on the line 44—44 of Fig. 43, showing the wheel spindle reciprocating mechanism;

Fig. 45 is a horizontal sectional view, taken approximately on the line 45—45 of Fig. 40, through the grinding wheel truing mechanism;

Fig. 46 is a fragmentary front elevation, on an enlarged scale, of a portion of the wheel truing apparatus, showing the electric control switches therefor;

Fig. 47 is a fragmentary vertical sectional view, taken approximately on the line 47—47 of Fig. 46;

Fig. 48 is a fragmentary front elevation, on an enlarged scale, of the truing tool;

Fig. 49 is an end elevation, on a reduced scale, taken approximately on the line 49—49 of Fig. 48, of the truing tool;

Fig. 50 is a cross sectional view, taken approximately on the line 50—50 of Fig. 3, through the wheel spindle reciprocating mechanism;

Fig. 51 is a partial hydraulic piping diagram showing the hydraulic control for the wheel spindle reciprocating mechanism;

Figure 53:
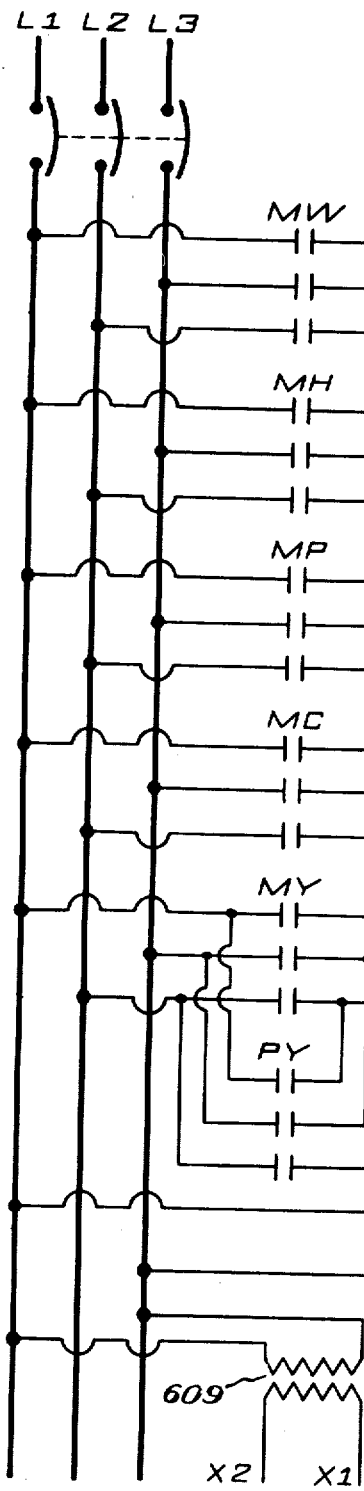
Figure 54:
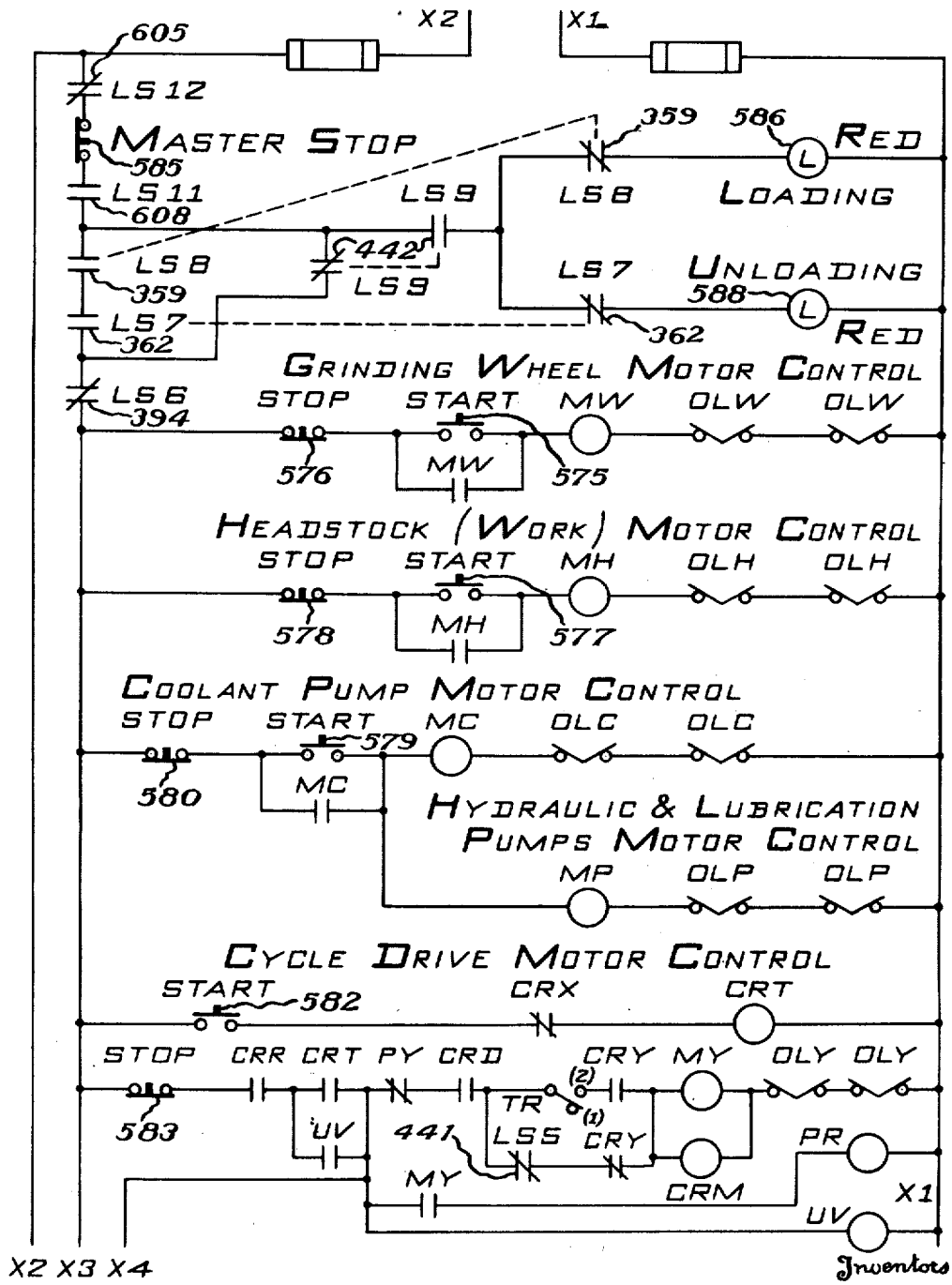
Figure 55:
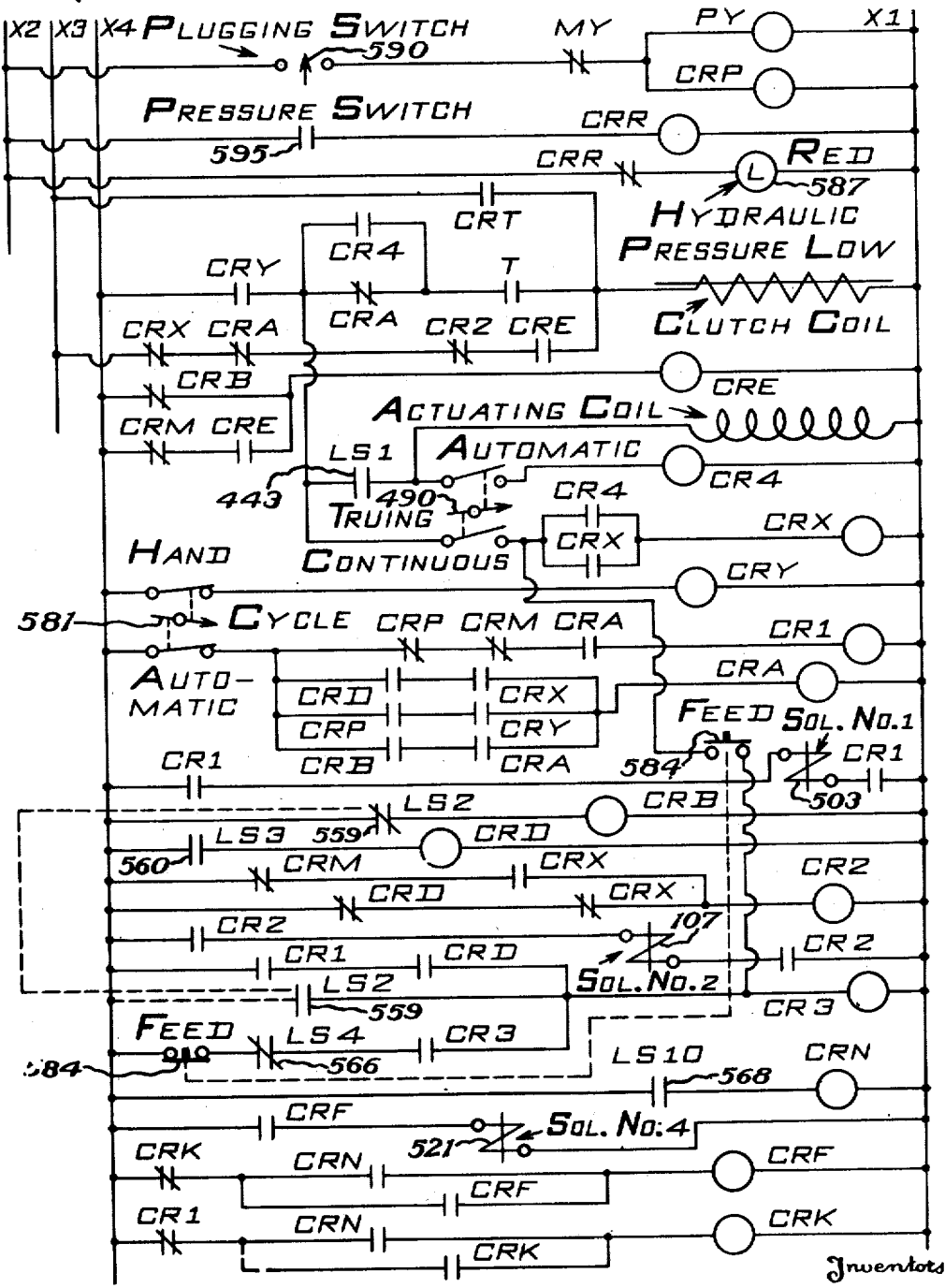
Figure 56:
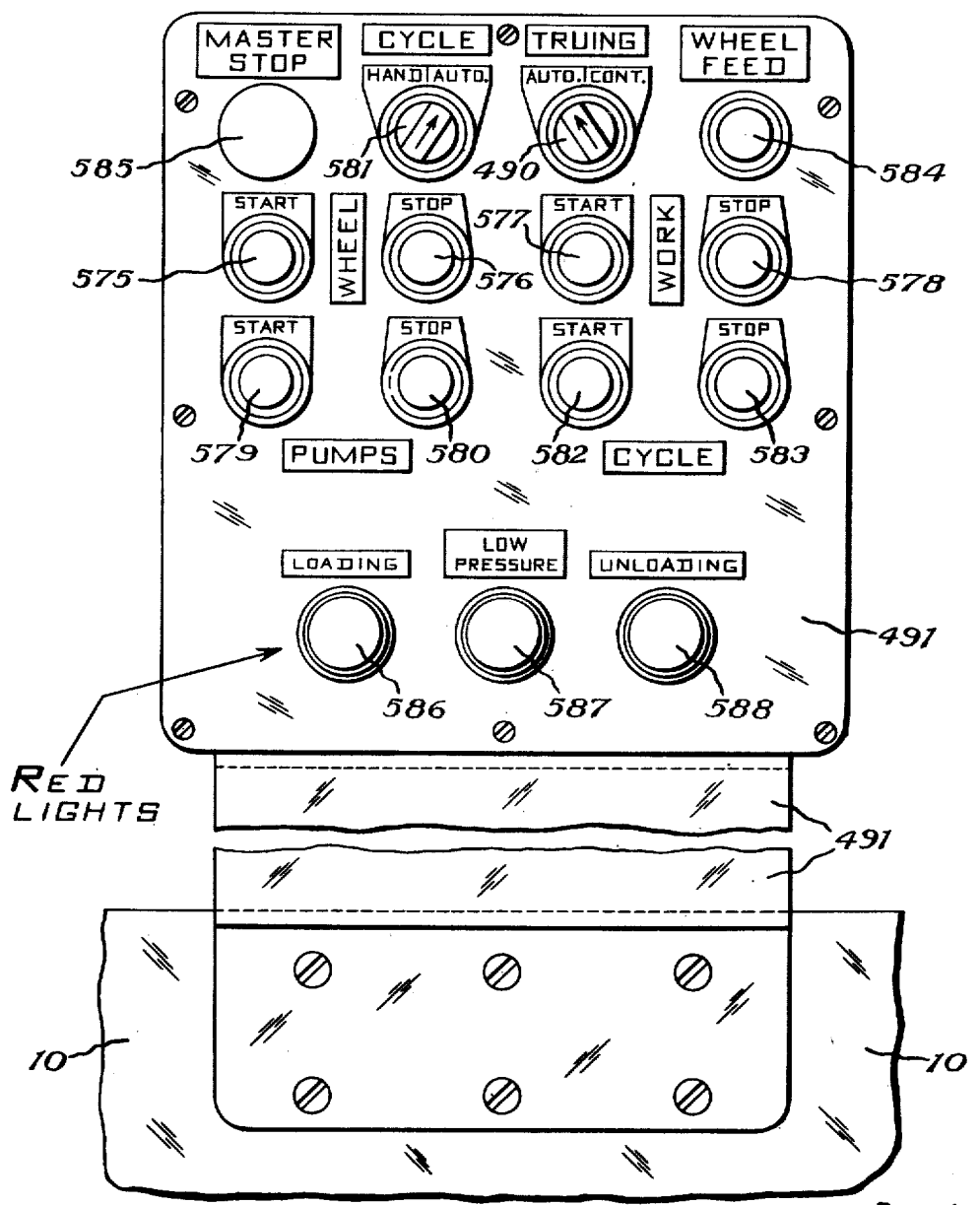

Figs. 53, 54 and 55 when arranged vertically end to end in numerical order illustrate an electric diagram of the electric controls and interlocks of the machine;

Fig. 56 is a front elevation of the push button control panel; and

Fig. 57 is a fragmentary detail view of an interlock to prevent index of the work turret frame unless a work piece is removed from the work collet of the spindle in a work discharge position.

An automatic grinding machine has been illustrated in the drawings comprising a base 10 which serves as a support for a rotatable grinding wheel 11. The grinding wheel 11 is mounted on the end of a rotatable wheel spindle 12. The wheel spindle 12 is supported in suitable bearings (not shown) in a transversely movable wheel slide 13. The wheel slide 13 is supported on a V-way 14 and a flat way 15 formed on the upper surface of a wheel slide base 16.

To facilitate adjusting the positioning of the grinding wheel 11 and the wheel spindle 12 for grinding an angular or frusto-conical face on a work piece, the wheel slide base 16 is arranged so that it may be adjusted in a horizontal plane relative to the base 10 about the axis of a vertically arranged stud 17 as a pivot (Figs. 42 and 21). A pinion 18 is formed integral with a stud 19 (Fig. 39) which is rotatably journaled in a vertical hole formed in a rearwardly extending bracket 21 on the wheel slide base 16. The pinion 18 meshes with an arcuate-shaped rack bar 20 which is fixedly supported on the base 10. It will be readily apparent from the foregoing disclosure that a manual rotary adjustment of the pinion 18 by applying a wrench to the squared-end 19a of the stud 19 will angularly adjust the wheel slide base 16 to position the grinding wheel 11 and the wheel spindle 12 in the desired position so that a peripheral cylindrical face on the grinding wheel 11 will grind a frusto-conical face on the work piece being ground. A pair of opposed adjustably mounted stop screws 22 and 23 are screw threaded into the bracket 21. The stop screws 22 and 23 are each provided with lock nuts to facilitate locking them in adjusted positions. The stop screws 22 and 23 are arranged in the path of stop abutments 24 and 25 respectively formed on the arcuate shaped bracket which supports the arcuate shaped rack 20.

The grinding wheel 11 is driven by an electric motor 26 which is mounted upon the wheel slide 13. The motor 26 is provided with a multi V-grooved pulley 27 which is connected by multiple V-belts 28 with a multi V-grooved pulley 29 on right hand end of the wheel spindle 12. To facilitate tensioning the V-belts, the motor 26 preferably is mounted on a slide plate 30 which is arranged to slide on suitable ways formed on the upper surface of the wheel slide 13. One end of an adjusting screw 31 is rotatably supported in a bearing bracket 32 which is fixedly mounted on the wheel slide 13. The adjusting screw 31 meshes with or engages a nut 33 depending from the under side of the slide plate 30. It will be readily apparent that by rotation of the screw 31, the multiple V-belts 28 may be tensioned as desired.

*Wheel feed mechanism*

A feeding mechanism is provided for feeding the grinding wheel slide 13 comprising a rotatable feed screw 36 which is journalled in anti-friction bearings 37 and 38 carried by the wheel slide base 16. A half nut 39 depending from the underside of the wheel slide 13 and meshes with or engages the feed screw 36 (Figs. 40 and 42). A bevel gear 40 is mounted on the forward end of the feed screw 36. The bevel gear 40 meshes with a bevel gear 41 which is mounted on the end of a shaft 42 (Fig. 42). The shaft 42 is journalled in bearings 43 and 44 which are supported in the wheel slide base 16. A manually operable feed wheel 45 is mounted on the end of the shaft 42. It will be readily apparent from the foregoing disclosure that a rotary motion of the feed wheel 45 is transmitted through the mechanism, above described, to feed the wheel slide 13 transversely relative to the wheel slide base 16 and the base 10.

An electrically controlled hydraulically actuated mechanism is provided for actuating the wheel feeding mechanism. This mechanism may comprise a ratchet wheel 46 which is fixedly mounted relative to the hand wheel 45. A plurality of friction plungers 47 and 48 serve to frictionally engage to steady the action of the ratchet wheel 46 and feed wheel 45. The pawl support 49 is provided with a stud 50 which serves as a pivotal support for a pair of pawls 51 and 52 (Figs. 40, 41, and 42). The pawl 52 is slightly longer than the pawl 51, to facilitate actuation of the ratchet wheel 46 when the pawl supporting member 49 is oscillated. A stop screw 53 is provided on the pawl supporting member 49. A fixed stop abutment 54 is arranged in the path of movement of the stop screw 53, to facilitate limiting the active stroke of the pawl supporting member 49 and the pawls 51 and 52.

The pawl supporting member 49 is provided with a rearwardly extending integral arm 55 (Fig. 40). An electrically controlled hydraulically actuated mechanism is provided for oscillating the arm 55 to actuate the feed mechanism above described. This mechanism may comprise a hydraulic cylinder 56 (Figs. 40 and 51). A piston 57 is slidably mounted in the cylinder 56 and is connected to the lower end of a piston rod 58. The upper end of the piston rod 58 is pivotally connected by a stud 59 with one end of a link 60. The other end of the link 60 is connected by a stud 61 with the arm 55. A compression spring 62 surrounds the piston rod 58 and is interposed between the piston 57 and an end cap enclosing the upper end of the cylinder 56 (Figs. 40 and 51). The spring 62 serves to exert a downward pressure on the piston 57.

A control valve 65 is provided for controlling the admission to and exhaust of fluid from a cylinder chamber 64 in the cylinder 56. The control valve 65 is a piston type control valve comprising a valve stem 66 having valve pistons 67 and 68 formed integrally therewith. A compression spring 69 normally serves to hold the valve stem 66 and pistons 67 and 68 in a right hand end position (Fig. 51). As shown in Fig. 51, fluid in the cylinder chamber 64 may exhaust through a pipe 63 into a valve chamber formed between the valve pistons 67 and 68 and pass out through an exhaust pipe 70 into a reservoir 71.

In order to operate the valve 65 in timed relation with other mechanisms of the machine, the valve is preferably arranged to be actuated by a solenoid 73 (Sol. 3). The solenoid is provided with an armature 74 which is pivotally connected to a link 75. The link 75 is pivotally connected to the upper end of the rock arm 76. The rock arm 76 is supported by means of a stud 77 which is in turn fixedly supported relative to the valve 65. The lower end of the rock arm 76 is connected by a stud 78 with the valve stem 66. An adjusting screw 79 is provided in the right hand end of the valve 65 to facilitate adjusting the right hand end position of the valve. It will be readily apparent from the foregoing disclosure that when the solenoid 73 (Sol. 3) is energized, the valve stem 66 will be shifted toward the left (Figs. 40 and 51) so as to admit fluid under pressure through the pipe 63 into the cylinder chamber 64 to cause an upward movement of the piston 57 so as to impart a one-pick feeding movement to the pawls 51 and 52 and the ratchet wheel 46.

Wheel spindle reciprocation

A wheel spindle reciprocating mechanism (Figs. 43, 44, 50 and 51) is provided for reciprocating the wheel spindle 12 axially within its bearings so as to reciprocate the grinding wheel 11 for a plunge-cut grinding operation. This mechanism may comprise a worm 80, mounted on the wheel spindle 12, which meshes with a worm gear 81. The worm gear 81 is keyed to a vertical shaft 82.

A T-bolt 83 is eccentrically and adjustably mounted in a T-slot 84 formed in a head 85 which is integral with the vertical shaft 82. A connecting rod 86 is rotatably connected at one end to the T-bolt 83. The other end of the connecting rod 86 is formed as a yoke 87. A yoked member 88 is pivotally supported on a vertical stud 89 which is fixedly mounted within the wheel slide 13 (Fig. 50). The yoke 88 supports a pair of diametrically arranged studs 90 and 91. The inner ends of the studs 90 and 91 fit within a pair of bearings 92 and 93 respectively, which are fixedly mounted in an annular ring 94. The ring 94 rides within a groove 95 (Fig. 51) which is formed in fixed relationship with the worm 80 and wheel spindle 12.

A stud 96 (Figs. 43, 44, and 50) extends upwardly from the upper arm of the yoke 88 and rides within the yoke 87 on the connecting rod 86. A rod 97 is slidably mounted within a hole 98 formed within an upwardly extending integral boss on the connecting rod 86. One end of the rod 97 is provided with an enlarged head having a hole which mates with the stud 96 (Fig. 44). A compression spring 99 surrounds a portion of the rod 97 and is interposed between the boss and a collar on the rod 97 and serves normally to maintain the stud 96 in engagement with the right hand end surface of the yoke 87 so that revolution of the T-bolt 83 will impart an oscillating motion to the rod 97 and through the stud 96 to oscillate the yoke 88 and thereby reciprocate the wheel spindle 12 axially within its bearings.

It is desirable to provide a suitable means for stopping reciprocation of the wheel spindle 12 for certain purposes, such as for example, a grinding wheel truing operation. This is preferably accomplished by means of a hydraulically operated mechanism comprising a cylinder 100 which is fixedly mounted within the wheel slide 13. A piston 101 is slidably mounted within the cylinder 100 and is arranged to engage the yoke 88. When it is desired to stop the reciprocation of the wheel spindle automatically in timed relation with the other mechanisms of the machine, fluid under pressure is passed through a pipe 102 into a cylinder chamber 103 formed at the right hand end of the cylinder 100 (Fig. 51) to move the piston 101 toward the left. The piston 101 engaged the yoke 88 and rocks it in a counterclockwise direction (Fig. 43) against the compression of the spring 99. This movement serves to shift the stud 96 toward the left (Fig. 44) a sufficient distance so that the normal movement of the connecting rod 86 will not oscillate the stud 96 or the yoke 88. An adjustable stop screw 104 on the yoke 88 is arranged to engage a stop screw 105 on the wheel slide 13 to limit the counterclockwise movement of the yoke 88. By adjustment of the stop screws 104 and 105, the yoke 88 may be moved to a predetermined position so that the stud 96 is in an inoperative position with respect to the yoke 87 and rod 86. When the wheel spindle reciprocation is stopped, the piston 101 maintains the stop screw 104 in engagement with the stop screw 105 and thereby positively to hold the wheel spindle 12 and grinding wheel 11 against axial movement.

A solenoid actuated control valve 106 (Fig. 51) is provided for controlling the admission of fluid under pressure to the cylinder 100. The valve 106 is actuated by a solenoid 107. A valve stem 108 is provided with a plurality of integral valve pistons 109, 110 and 111. A motor driven fluid pump 112 draws fluid through a pipe 113 from the reservoir 71 and forces fluid under pressure through a pipe 114 into a valve chamber 115 formed between the valve pistons 109 and 110. In the position of the valve 106 (Fig. 51) fluid under pressure entering the valve chamber 115 passes outwardly through an exhaust pipe 116 into the reservoir 71. When the solenoid 107 is energized automatically, as will be hereinafter described, the valve stem 108 is moved upward so that fluid under pressure in the pipe 114 passes into a valve chamber 117 and out through the pipe 102 into the cylinder chamber 103 to stop the reciprocation of the wheel spindle 12 and the grinding wheel 11 as above described.

Work turret

Figure 1:
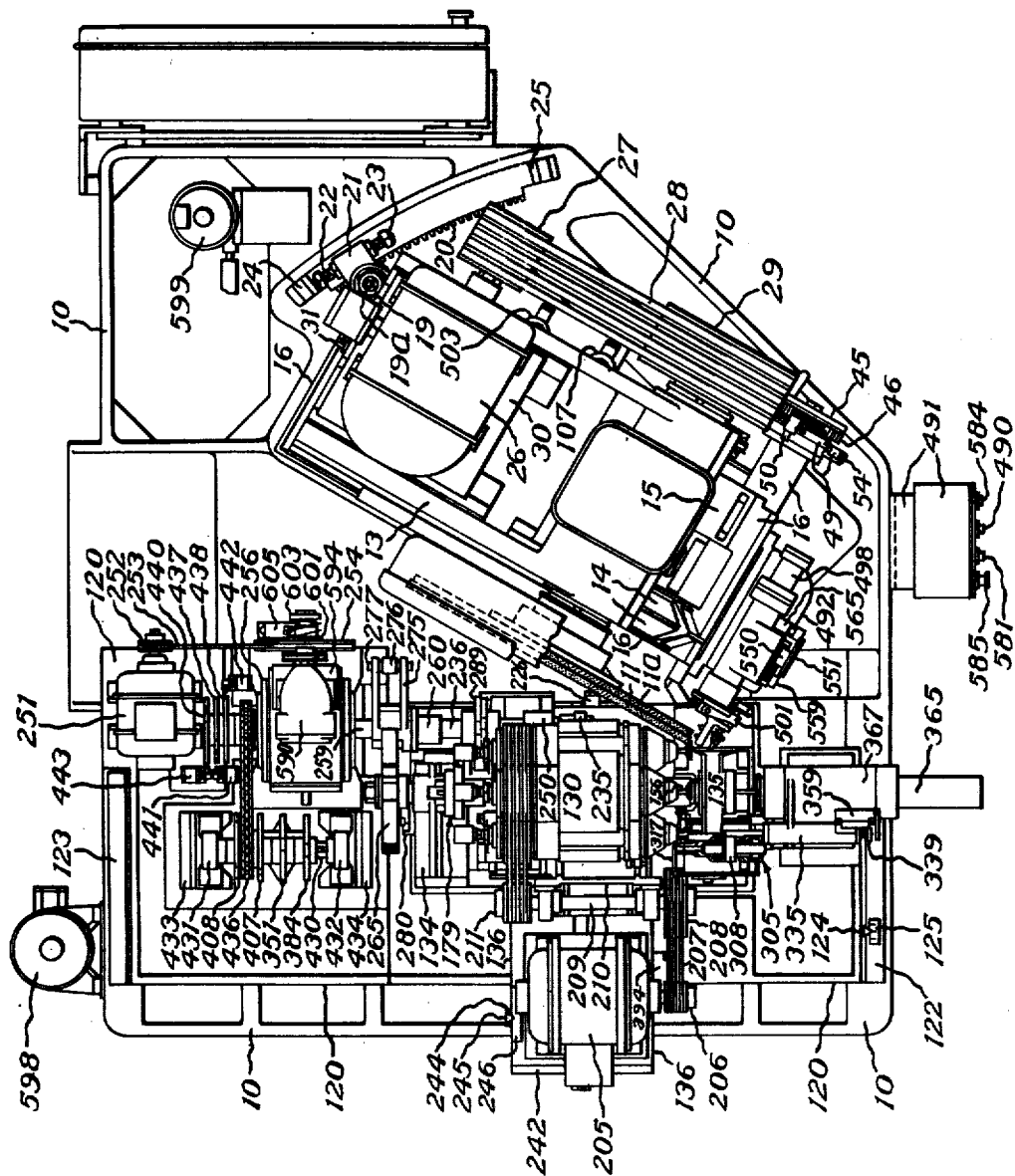

A turret-type work supporting unit is provided rotatably to support a plurality of work pieces and to convey them from a loading position into a grinding position and then automatically to an unloading position. A work supporting unit base 120 is mounted on the front portion of the machine base 10. The unit base is arranged for a transverse adjustment in a horizontal plane relative to the base 10. A clamping block 122 (Fig. 5) is arranged to clamp the right hand end of the unit base 120 relative to the base 10. A clamping block 123 (Fig. 37) is similarly arranged to clamp the left hand end of the unit base 120 relative to the base 10. In order to facilitate a precise transverse adjustment of the unit base 120 relative to the base 10, a graduated scale 124 is provided on the clamping block 122 and an index pointer 125 is mounted on the front end unit base 120 (Fig. 1). The unit base 120 serves as a support for a multiple spindle turret-type work support, a work loading and discharge mechanism, and a turret indexing and spindle driving mechanism as will be described in detail hereinafter.

A multiple spindle turret frame 130 is keyed on a supporting shaft 131. The shaft 131 is journalled in bearings 132 and 133 mounted in brackets 134 and 135 respectively (Fig. 2) which are fixedly mounted on a frame 136. The turret frame 130 is provided with a plurality of longitudinally extending cylindrical bores or apertures 137, 138, 139 and 140 which are arranged parallel with the axis of the shaft 130 (Figs. 2 and 3). A plurality of unitary or cartridge-type work spindle units 141, 142, 143 and 144 are mounted within the apertures 137, 138, 139 and 140 respectively.

Each of the wheel spindle units 141, 142, 143 and 144 is provided with a rotatable work spindle 145, 146, 147 and 148 respectively. All of the wheel spindle units 141, 142, 143 and 144 are identical in construction, consequently only one of these units, namely, 141 has been illustrated in detail in Fig. 2. The work spindle 145 is supported in bearings 149 and 150.

Each of the work spindle units is provided with a work chucking collet 155 (Fig. 4) which is arranged to receive a valve 156 having a valve face 157 to be ground by the grinding wheel 11.

Figure 52:
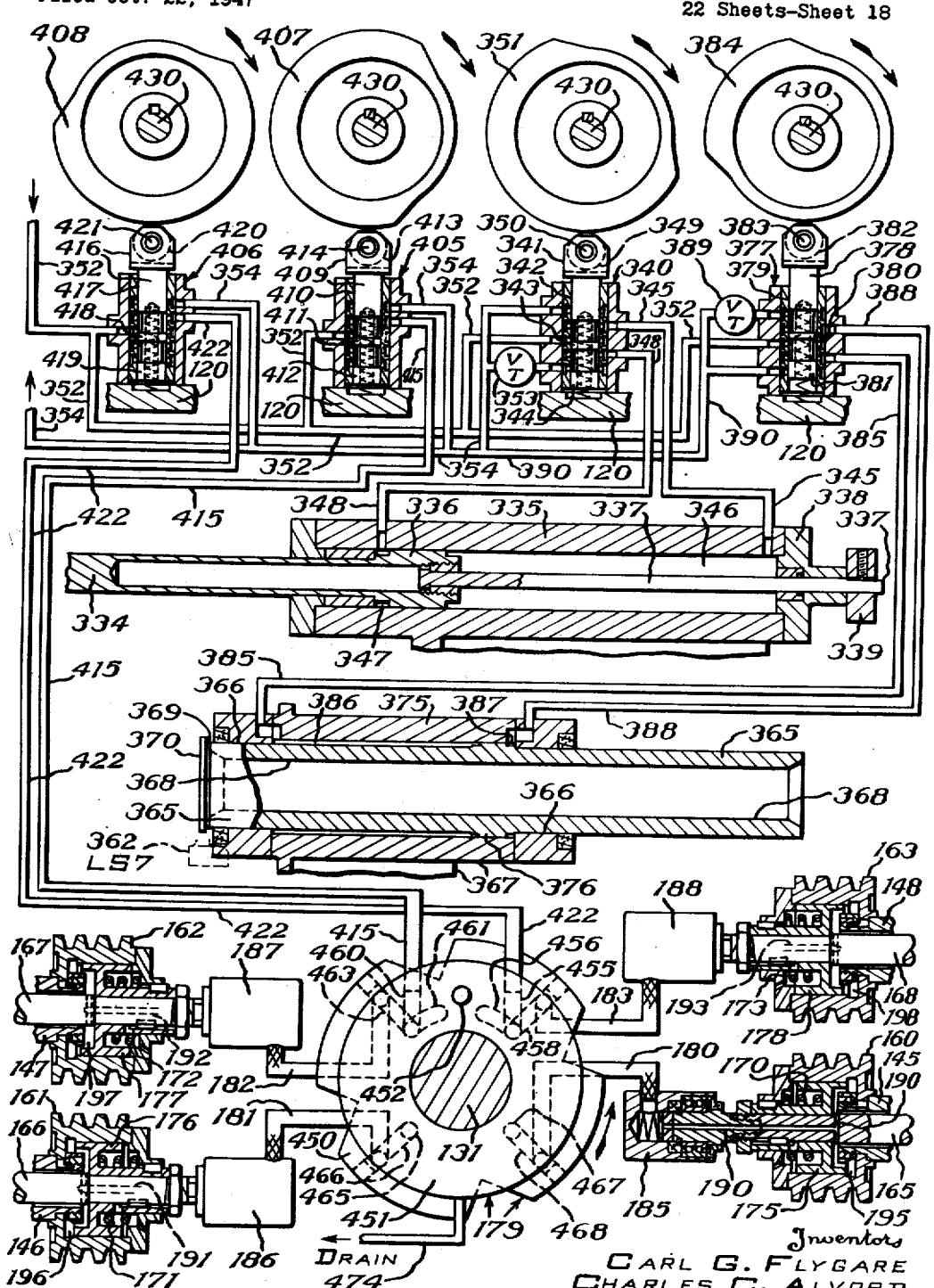
Fig. 52 is a hydraulic piping diagram of the remainder of the hydraulic system, showing the hydraulic control for the work loading and unloading mechanism, and the work chuck clamping and releasing mechanism.

The work spindles 145, 146, 147 and 148 are each provided with a multiple V-groove pulley 160, 161, 162 and 163 (Fig. 52). Chuck actuating rods 165, 166, 167 and 168 are contained within the work spindles 145, 146, 147 and 148. Each of the work spindle units 141, 142, 143 and 144 is provided with a compression spring 170, 171, 172 and 173 respectively (Fig. 52) which are arranged to exert a pressure on pistons 175, 176, 177 and 178 contained within cylinders formed within the pulleys 160, 161, 162 and 163 respectively.

A pilot valve 179, to be hereinafter described, serves to successively admit fluid under pressure through a plurality of flexible pipes 180, 181, 182 and 183 to a plurality of rotor seal units 185, 186, 187 and 188 respectively. These rotor seal units are supported on the ends of the work spindle units 141, 142, 143 and 144 and serve to convey fluid under pressure to the cylinder contained within the rotating pulleys 160, 161, 162 and 163. Fluid under pressure passing through the rotor seals 185, 186, 187 and 188 passes through passages 190, 191, 192 and 193 respectively into cylinder chambers 195, 196, 197 and 198 respectively to exert a pressure on the pistons 175, 176, 177 and 178 to move the chuck actuating rods 165, 166, 167 and 168 respectively toward the left (Fig. 2). It will be readily apparent from the foregoing disclosure that the compression springs 170, 171, 172 and 173 serve to move the pistons 175, 176, 177 and 178 toward the right to actuate the work supporting collets 155 to clamp a valve 156 in an operative position for a grinding operation. When fluid under pressure is admitted to the cylinder chambers 195, 196, 197 and 198 the rods 165, 166, 167 and 168 are moved toward the left (Fig. 2) to unclamp the work supporting collet 155 to release the valve 156.

A suitable driving mechanism is provided for successively driving the spindles 145, 146, 147 and 148 when indexed into an idle and a grinding position. In order to facilitate loading and unloading of work pieces, the spindles 145, 146, 147 and 148 remain stationary as they are successively indexed into unloading and loading positions. An electric motor 205 is adjustably mounted on the upper surface of the frame 136 (Fig. 16). The motor 205 is provided with a multiple V-groove pulley 206 which is connected by a plurality of V-belts 207 with a multiple V-groove pulley 208. The pulley 208 is supported on a shaft 209 which is in turn journalled in suitable bearings (not shown) in a bracket 210. The bracket 210 is adjustably mounted on the upper surface of the frame 136. By adjusting the position of the bracket 210 or the support for the motor 205, the V-belts 207 may be tensioned as desired. The shaft 209 also supports a multiple V-groove pulley 211 which is connected by multiple V-belts 212 with the pulleys 160, 161, 162 and 163. In the position shown in Fig. 16, the belts 212 wrap around a portion of the pulleys 160 and 161 to rotate the work spindles 145 and 146. In this position of the work turret frame 130, the pulleys 162 and 163 are out of engagement with the driving belts 212. The turret frame 130 is indexed in a counterclockwise direction (Fig. 16) after a grinding operation has been completed so that spindle 146 is moved into an operative position for a grinding operation while spindle 145 is moved into a lower position for discharging the ground work piece in a manner to be hereinafter described.

A belt tensioning device is provided for maintaining the driving belts 212 properly tensioned for driving the spindles which may comprise an idler pulley 213 which is mounted on a shaft 214 carried by an arm 215. The arm 215 is pivotally supported on a rock shaft 216 which is journalled in a bracket 217 carried by the frame 136. A tension spring 218 is connected between the arm 215 and a stud 219 on the bracket 210 to produce the desired tension on the idler pulley 213 to maintain the belts 212 in proper driving contact with the work spindle pulleys 160, 161, 162 and 163 as the work turret frame is indexed.

In order to obtain the desired automatic feeding movement between the work being ground and the grinding wheel 11, the turret supporting frame 136 is preferably pivotally supported on a pair of spaced aligned trunnion studs 220 (Figs. 21 and 24) which is carried by a pair of spaced brackets 221 fixedly mounted on unit base 120. The frame 136 is arranged so that it may be automatically rocked by a mechanism to be hereinafter described to move the work turret frame 130 toward and from the grinding wheel to grind the face 157 of the valve 156 to the desired and predetermined size.

The unit base 120 is arranged so that it may be adjusted transversely relative to the base 10 to separate the work unit from the grinding wheel to facilitate replacement of the grinding wheel. This mechanism may comprise a feed screw 223 which mates with or engages a nut 224 which is fixed relative to the base 10. The right hand end of the feed screw 223 is rotatably journalled in an end cap 225 (Fig. 16) which is fastened to the end of the slide 222. An adjustable tapered gib 226 is provided, one side of which slides on plane surfaces 227 and 228 which are fixedly mounted on the top of the base 10. The tapered slide 229 of the gib 226 engages correspondingly shaped surfaces formed on a key fixedly mounted to the unit base 120. By adjustment of the gib 226, lost motion between the slide and the base may be readily taken up.

A suitable feeding mechanism is provided for automatically rocking the frame 136 through an adjustable stroke to obtain the desired automatic feeding of the work spindle turret frame 130. This mechanism may comprise a rock arm 230 (Fig. 24). The rock arm 230 is supported on a rock shaft 231 which is journalled in a bracket 232 (Figs. 16 and 24). The left hand end of the rock arm 230 is provided with a roller 233 which is supported by a stud 234. A feed cam 235 is keyed on a drive shaft 236. It will be readily apparent from the foregoing disclosure that when the shaft 236 is rotated, a motion as governed by the cam 235 will be imparted to the rock arm 230.

In order to facilitate providing a variable feeding movement, a roller 237 is mounted on a stud 238 carried by a slide 239 which is arranged to be adjusted relative to the frame 136 (Figs. 16 and 24). A rotatable feed screw 240 meshes with or engages a nut 241 formed in or fixedly mounted relative to the slide 239. The right hand end of the feed screw 240 is rotatably journalled in an end cap 242 which is fixedly mounted on the right hand end of the frame 136. The rock arm 230 is provided with a plane face 243 on which the roller 237 rides. In order to adjust the extent of rocking of the frame 136, the screw 240 may be adjusted so that the slide 239 and pivot stud 238 are moved toward or from the axis of the shaft 231. It will be readily apparent from the foregoing disclosure that movement of the stud 238 toward the right will increase the lever arm between the axis of the stud 238 and the axis of the rock shaft 231 thus increasing the extent of the rocking movement of the frame 136 and consequently increasing the amount of infeeding movement of the work turret frame 130. Similarly, adjustment of the slide 239 and the stud 238 toward the axis of the rock shaft 231 decreases the length of the lever arm and consequently decreases the rocking movement of the frame 136 as governed by the cam 235.

In order to facilitate speedy adjustment of the feeding mechanism to obtain a desired and predetermined feed of the work into the grinding wheel 11, a suitable indexing mechanism is provided which may comprise an arm 244 which is fixedly mounted to the stud 238 (Figs. 16 and 27). The arm 244 is provided with an index pointer 245 which is arranged adjacent to a graduated scale 246 (Figs. 27 and 28). The scale 246 is fixedly mounted relative to and on the upper surface of the frame 136. It will be readily apparent from the foregoing disclosure that by adjusting the feed screw 240 until the index pointer 245 is opposite the desired feed on the scale 246, the mechanism may be readily adjusted for a desired and predetermined feed.

Cycle driving unit

A cycle driving unit is provided for automatically controlling the operating cycle of the machine. This unit comprises a cycle driving motor 251 and a speed reduction unit 256 which is drivingly connected to drive a plurality of master controlling cams for synchronously controlling various mechanisms of the machine, and for driving a Geneva index mechanism to index the work spindle turret as will be hereinafter described.

Work turret—Indexing

A suitable automatically actuated indexing mechanism is provided to automatically index the work spindle turret frame 130 so as to shift work spindles 145, 146, 147 and 148 from a work loading position to a grinding position and after a grinding operation to a work discharge position. In the preferred construction, a geneva-movement actuated indexing plate and pawl are provided to facilitate the indexing movement of the work turret frame 130. The shaft 236 is rotatably supported in a bearing bracket 250 (Fig. 21) which is fixedly mounted on the work unit base 120. The electric motor 251 is mounted on the work unit base 120 (Fig. 1). The motor 251 is provided with a V-grooved pulley 252 which is connected by a V-belt 253 with a V-groove pulley 254 (Figs. 1 and 34). The pulley 254 is mounted on a shaft 255 of a speed reduction unit 256 which is mounted on the work unit base 120. The shaft 255 is provided with a worm 257 which meshes with a worm gear 258 (Fig. 34). The worm gear 258 is mounted on a shaft 259 which is arranged in axial alignment with the shaft 236 and is connected thereto by means of a coupling 260 (Fig. 21).

An index plate 265 is mounted on the end of the work turret shaft 131. The index plate 265 is provided with a plurality of notches 266, 267, 268 and 269 (Fig. 17) which are intermittently engaged with an index or locating pawl 270.

To facilitate imparting an indexing movement to the plate 265, the shaft 131 and the work turret 130, the index plate 265 is provided with a plurality of radially extending slots 271, 272, 273 and 274 (Fig. 17). The shaft 259 is provided with an arm 275 (Figs. 17 and 21) having a roller 276 supported at its outer end by a stud 277. The operation of this geneva-movement will be readily apparent from the foregoing disclosure. When the shaft 259 is rotated slowly by the motor 251, the roller 276 is intermittently and successively revolved in engagement with the slots 274, 271, 272 and 273 to impart an intermittent indexing movement to the plate 265 and the work turret frame 130. The revolving roller 276 indexes the plate 265 through a 90° angle during each revolution of the roller 276.

The pawl 270 is automatically controlled so that after each indexing movement of the plate 265, the pawl 270 is automatically moved into engagement with one of the notches 266, 267, 268 or 269. The pawl 270 is carried by a rock arm 280 which is fixedly mounted on one end of a rock shaft 281 (Figs. 17 and 18). The rock shaft 281 is supported in bearings 282, 283 which are fixedly supported relative to the work unit frame 136 (Fig. 18). The index pawl 270 is preferably adjustably mounted on the arm 280. The index pawl 270 is carried by a block 284 which is adjustable longitudinally relative to the arm 280 by means of an adjusting screw 285. A plurality of clamping screws 286 are provided to facilitate clamping the block 284 and the pawl 270 in adjusted position. This adjustment serves to facilitate precisely locating the pawl so that the work indexing mechanism will precisely index the work spindles successively into grinding positions.

The pawl 270 is automatically actuated by a pair of cams 288 and 289 which are adjustably mounted on the shaft 236 (Figs. 21, 22 and 23). A follower roller 290 is mounted on a stud 291 which is carried by an arm 292. The arm 292 is fixedly mounted on the other end of the rock shaft 281 (Fig. 18). In order to facilitate timing the movement of the pawl 270, the two substantially identical cams 288 and 289 are both adjustably mounted on the shaft 236 (Figs. 21, 22 and 23).

The cam 288 is provided with an integral hub 297 which is slotted and is provided with a clamping screw 298 for clamping the cam on the shaft 236. The hub 297 is provided with a pair of spaced push- and pull-screws 299 and 300 which are screw threaded into the hub 297. The ends of the screws 299 and 300 engage longitudinally extending notches cut in the periphery of the shaft 236. The cam 289 is similarly provided with an integral hub 293 which is slotted and is provided with a clamping screw 294 for clamping the cam relative to the shaft 236. The hub 293 is similarly provided with a pair of spaced push- and pull-screws 295, 296 which are screw threaded into the hub 293. The ends of the screws 295 and 296 engage the same longitudinally extending notches cut in the periphery of the shaft 236

(Figs. 21, 22 and 23). It will be readily apparent from the foregoing disclosure that by adjustment of the push- and pull-screws 299 and 300 and 295 and 296, the position of the cams 288 and 289 may be adjusted relative to each other and also relative to the shaft 236 to facilitate timing the movement of the pawl 270 into and out of engagement with the notches 266, 267, 268 and 269 of index plate 265. The cams 288 and 289 are preferably adjusted and positioned relative to the shaft 236 so that the index pawl 270 automatically moves into engagement with one of the notches in the index plate 265 when the geneva-movement above described has indexed the plate 265 and work turret frame 130 so as to precisely locate one of the work spindles in an operative grinding position. The cams 288 and 289 are adjusted relative to each other so that the pawl 270 automatically is disengaged from the notch on the index plate 265 before the roller 276 of the geneva-movement indexing mechanism starts an indexing movement of the plate 265 and the work turret frame 130. A compression spring 301 is interposed between the arm 280 and a portion of the frame 136 tends normally to rock the arm 280 in a counterclockwise direction (Fig. 17) so as to maintain the index pawl 270 in operative engagement with one of the notches 266, 237, 268 or 269 of the index plate 265 positively to hold the work turret frame 130 during a grinding operation. It will be readily apparent from the illustration in Figs. 22 and 23 that the follower roller 290 remains out of engagement with the peripheries of the cams 288 and 289 except during disengagement of the pawl 270, indexing of the plate 265 and the work turret frame 130 and engagement of the pawl 270 with the index plate 265 after an indexing movement has been completed.

*Work loading*

An automatically actuated mechanism is provided for automatically conveying successive work pieces from a hopper (not shown) into the work supporting collets or chucks 155. A plurality of valves 156 are loaded into a standard commercial hopper (not shown) which fits successive work pieces or valves 156 automatically to an arcuate shaped chute 305 (Figs. 5, 6 and 8). The chute 305 comprises a pair of spaced arcuate shaped plates 306 and 307 (Figs. 10 and 15). A pair of substantially U-shaped brackets 308 and 309 (Figs. 10 and 15) are provided for supporting the plates 306 and 307. The plates 306 and 307 are spaced from each other by an amount slightly exceeding the diameter of the stem of the valves 156 to be ground, so that the valve stems are free to slide downwardly therebetween. The outer edge of the plates 306 and 307 are flared outwardly to form a track 310 (Fig. 15) on which the heads of the valves 156 may slide. An arcuate shaped plate 311 is fastened to the brackets 308 and 309 (Fig. 10) to maintain the valves 156 in position within the loading chute. A stop abutment 312 is mounted on the lower end of the plate 311 (Figs. 10 and 15) which serves to locate the valves as they are successively moved into engagement with a plane surface 313. A bracket 315 (Fig. 8) carried by the work unit frame 136 serves as a support for the chute 305.

A pivotally mounted transfer member 316 (Fig. 11) is provided for sliding the valve 156 across the plane surface 313 into a loading position. A frame 317 (Fig. 11) is fastened to the transfer member 316. The frame 317 surrounds the valve 156 and serves to maintain the valve 156 in position relative to the transfer member 316. The transfer member 316 is mounted on the upper end of a rock arm 318 (Figs. 5 and 6) which is adjustably supported on a rock shaft 319. The rock shaft 319 is journalled in bearing brackets 320 and 321 which are fixedly mounted relative to the work unit frame 135. An arm 322 is fixedly mounted on the left hand end of the rock shaft 319 (Fig. 5). A roller 323 is mounted on the upper end of the arm 322 and is arranged to engage a peripheral surface of a cam 324 which is formed on the work turret frame 130. The rotation of the work turret frame during indexing of the work chucks, will cause an intermittent rotation of the cam 324 which operates through the roller 323, the arm 322, the rock shaft 319, the rock arm 318 to move the transfer member 316 so as to move a valve 156 to be ground into an operative loading position relative to the chuck to be loaded. A spring 325 connected between the bearing bracket 320 and the collar 326 on the rock shaft 319 serves to normally urge the roller 323 and to maintain it in operative engagement with the cam 324.

When the rock arm 318 is rocked in a clockwise direction (Fig. 8) the transfer member 316 slides the valve 156 toward the left (Figs. 12 and 14), until the valve 156 drops into a channel 328 formed in a block 329. The valve 156 drops into the channel 328 so that the valve head engages a longitudinally extending V-shaped surface 332 and 333 (Figs. 13 and 14) and the valve stem engages a V-shaped surface 330 and 331 (Figs. 12 and 13). In this position, the valve 156 to be ground is axially aligned with the work chuck 155 which is in a loading position.

A hydraulically operated mechanism is provided for moving the valve 156 axially into the chuck 155. This mechanism may comprise a plunger 334 (Figs. 13 and 52) which is arranged in axial alignment with the work chuck 155 in a loading position. A cylinder 335 is mounted in fixed relationship with the work unit base 120. A piston 336 is slidably mounted within the cylinder 335 and is preferably formed integral with the piston rod or plunger 334. The movement of the plunger 334 toward the left (Fig. 52) may be limited if desired to facilitate positioning the valve 156 within the chuck 155. A rod 337 is slidably connected to the piston 336. An adjustable stop collar 339 is mounted on the right hand end of the rod 337. The collar 339 serves to actuate a limit switch 359 (LS8) which will be hereinafter described. The loading plunger 334 always moves to the extreme left hand end position with the piston 336 engaging a bushing in the left hand end of the cylinder 335. When the plunger 334 reaches an extreme left hand position, a valve 156 is moved into a predetermined position in the collet 155.

A control valve 340 (Fig. 52) is provided for controlling the admission to and exhaust of fluid from the cylinder 335. The control valve is a piston type valve comprising a valve stem 341 having a plurality of valve pistons 342, 343 and 344 formed integral therewith. A roller 349 is supported by a stud 50 on the upper end of the valve stem 341. A control cam 351 is provided for actuating the valve 340 in timed relationship with other mechanisms of the machine in a manner to be hereinafter described.

In the position of the valve 340 (Fig. 52) fluid under pressure from the pump 112 (Fig. 51) passes through a pipe 352 (Figs. 51 and 52) into a valve chamber located between the valve pistons 342, 343 (Fig. 52), through a pipe 345 into a cylinder chamber 346 to move the piston 336 and plunger 334 toward the left (Fig. 52) to push a valve 156 to be ground into the work chuck 155. During this loading operation, fluid within a cylinder chamber 347 exhausts through a pipe 348 into a valve chamber located between the valve pistons 343 and 344, through an adjustable throttle valve 353 and an exhaust pipe 354 (Figs. 51 and 52) into the reservoir 71. It will be readily apparent from the foregoing disclosure that by manipulation of the throttle valve 353, the rate of exhaust from the cylinder chamber 347 may be readily controlled thereby to control the rate of movement of the loading plunger 334 in pushing a valve 156 into the work chuck 155.

*Work discharge*

An automatically operated mechanism is provided for withdrawing ground valves from work chucks 155 when the chucks are successively indexed to a lower or discharge position. This mechanism may comprise a longitudinally movable sleeve 365 which is slidably supported in an aperture 366 formed in a frame 367 which is fixed relative to the work unit base 120. The sleeve 365 is provided with a central bore 368 which is in axial alignment with valve 156 and chuck 155 when the chuck 155 is in a lower or work discharge position. A flexible rubber disc 369 (Figs. 7 and 9) is mounted on the left hand end of the sleeve 365 (Figs. 5 and 7) by means of an annular ring 370 which is fastened to the sleeve 365 by a plurality of screws 371. The rubber disc 369 is provided with a central aperture 372, the diameter of which is less than the diameter of the head of the valve 156. The rubber disc 369 is provided with a plurality of radial slots 373 (Fig. 9) which form a plurality of flexible sections 374. When the sleeve is moved toward the left, the sections 374 of the disc 369 will flex and pass over the head of the valve 156. The chuck 155 is then released so that when the sleeve 365 is moved toward the right (Figs. 5 and 7) the sections 374 of the disc 369 will engage the head of the valve 156 and withdraw the ground valve from the chuck 155.

The sleeve 365 is automatically actuated by a hydraulically operated mechanism comprising a cylinder 375 formed in the frame 367. A piston 376 is formed integral with the sleeve 365 and slides within the cylinder 375.

A control valve 377 is provided for controlling admission to an exhaust of fluid from the cylinder 375. The control valve 377 is a piston type valve comprising a valve stem 378 having a plurality of valve pistons 379, 380 and 381 formed integrally therewith. A roller 382 is mounted on a stud 383 supported at the upper end of the valve stem 378. A cam 384 engages the roller 382 and serves to automatically actuate the valve 377 in timed relationship with the other mechanisms of the machine. Fluid under pressure passing through the pipe 352 enters a valve chamber formed between the valve pistons 380 and 381 and passes out through a pipe 385 into a valve chamber 386 to move the piston 376 and sleeve 365 toward the right (Fig. 52). During this movement of the piston 376, fluid within a cylinder chamber 387 is exhausted through a pipe 388 into a valve chamber formed between the valve pistons 379 and 380, through an adjustable throttle valve 389 and a pipe 390 which connects with the pipe 354 to exhaust fluid into the reservoir 71. It will be readily apparent from the foregoing disclosure that by manipulation of the throttle valve 389, the movement of the piston 376 and sleeve 365 in withdrawing a valve 156 from the chuck 155 may be readily controlled so that either a rapid or a slow withdrawal movement may be obtained.

It is desirable to provide a support for the stem of the valve 156 when it is withdrawn from the chuck 155. As shown in Fig. 7, a rock arm 395 is supported on a stud 396. A tension spring 397 which is connected between a stud 398 and the lower end of the rock arm 395 serves normally to hold the rock arm 395 in the position illustrated in Fig. 7 with a stop screw 399 engaging a stop stud 400. When the sleeve 365 is moved toward the left to pick up a ground valve, the periphery of the flange 370 will engage a partial cylindrical surface 401 formed on the upper end of the rock arm 395 (Fig. 9) and the rock the arm 395 in a counter-clockwise direction into the broken line position 395a (Fig. 7). When the sleeve 365 starts to move toward the right to withdraw a valve 156 from the chuck 155, the rock arm 395 under the influence of the spring 397 will rock it the full line position (Fig. 7) as soon as the flange 370 permits. The rock arm 395 is provided with a channel 402 (Fig. 9). A V-groove roller 403 carried by a stud 404 on the rock arm 395 moves upwardly into engagement with the stem of the valve 156 to support the stem as the valve is withdrawn from the chuck. The valve 156 remains in the position illustrated in Fig. 7, until the next movement of the sleeve 365 toward the left. When the sleeve 365 moves toward the left, the end of the stem of the valve 156 engages the head of the next valve to be discharged and continued movement of the sleeve 365 pushes the valve 156 toward the right relative to the sleeve 365. This longitudinal movement of the valve 156 also moves a plurality of valves contained within the bore 368 of the sleeve 365. When the valves 156 are moved through the right hand end of the bore 368 of the sleeve 365, they drop into a discharge chute not shown and are carried away from the machine.

*Interlocks—Work loading and unloading*

It is desirable to provide a suitable interlock to prevent an indexing movement of the work turret frame 130 unless the work loading plunger 334 has moved to the extreme left hand loading position. Unless the valve 156 being loaded is in a predetermined position within the work supporting collet 155, the turret frame cannot be indexed. In order to accomplish this desired result, the collar 339 mounted on the end of the rod 337 is arranged to engage an actuating arm 358 of a limit switch 359. The limit switch 359 is a double throw limit switch and is connected so that the turret indexing motor 251 cannot be started unless the limit switch 359 is closed. It will be readily apparent from the foregoing disclosure that an indexing movement of the turret frame 130 is prevented unless the valve to be ground is in an operative position within the work supporting collet 155.

It is similarly desirable to prevent an indexing movement of the work turret frame 130 unless the ground valve 156 is withdrawn from the work supporting collet 155 when the spindle is in a work discharge position. A pivotally mounted rock arm 391 is supported on a fixed pivot stud 392. The arm 391 is connected by means of a link 393 with a limit switch 394. The upper end of the arm 391 is arranged in the path of the stem of a valve 156 so that if the turret frame indexing starts before the ground valve 156 has been withdrawn from the collet 155 when it is in a discharge position, the valve stem will engage the arm 391 (Fig. 57) and rock it in a counterclockwise direction. A counter-clockwise movement of the rock arm 391 serves to actuate the normally closed limit switch 394 to stop the turret indexing motor 251 thus preventing damage to the machine.

*Hydraulic control—Work chucks*

It is desirable to provide a suitable automatically controlled means for supplying fluid under pressure to the cylinder chambers 195, 196, 197 and 198 on the work turret frame 130 in timed relationship with the indexing movement of the work turret so that ground valves may be discharged from the work supporting collet 155 when the spindle is in a discharge position and so that the collet 155 is maintained in an open condition when the spindle and collet 155 are in a loading position. This is preferably accomplished by a cam controlled hydraulically operated mechanism for controlling the admission to an exhaust of fluid from the pilot valve 179.

A pair of piston type control valves 405 and 406 are provided for controlling the admission to an exhaust of fluid from the pilot valve 179. A pair of cams 407 and 408 are provided for automatically actuating the control valves 405 and 406.

The control valve 405 comprises a valve stem 409 having a plurality of valve pistons 410, 411 and 412 formed integrally therewith. An actuating roller 413 mounted on a stud 414 is supported on the upper end of the valve stem 409. A compression spring within the lower end of the valve stem 409 serves to maintain the roller 413 in operative engagement with the cam 407 during rotation thereof. A pipe 415 is connected between the control valve 405 and the pilot valve 179 (Fig. 52).

Similarly the valve 406 comprises a valve stem 416 having a plurality of valve pistons 417, 418 and 419 formed integrally therewith. An actuating roller 420 mounted on a stud 421 is supported on the upper end of the valve stem 416. A compression spring within the lower end of the valve stem 416 serves to maintain the roller 420 in operative engagement with the cam 408 during rotation thereof. A pipe 422 is connected between the control valve 406 and the pilot valve 179 (Fig. 52).

The pilot valve 179 is preferably a rotary valve which is arranged to pass fluid from a stationary part to a part which rotates with the work turret frame 130. The pilot valve 179 consists of a flange disc-shaped valve rotor 450 (Figs. 2, 30, 31, 32, 33 and 52) which is keyed on the work turret shaft 131 (Fig. 31), and a disc-shaped valve member 451 which is rotatably supported on the shaft 131. The valve member 451 is provided with a stud 452 which extends between a pair of opposed adjusting screws 453 and 454 (Fig. 30). The opposed screws 453 and 454 are carried by the bracket 134 and serve to hold the valve member 451 against rotation during an indexing movement of the work turret frame 130. By manipulation of the screws 453 and 454, the valve member 451 may be rotarily adjusted relative to the bracket 134 and serve to facilitate timing the operation of the valve 179.

The pipes 415 and 422 are connected to the stationary valve member 451. As shown in Figs. 32 and 33, the pipe 422 is connected with a passage 455 and an elongated arcuate port 456 (Fig. 32) formed in the valve member 451. In the position of the valve parts (Figs. 32 and 33) fluid passing through the port 456 enters a port 457 in the valve member 450 (Figs. 33 and 52) and passes through a radially extending passage 458 in the valve member 450 and through the flexible pipe 183 (Fig. 52) into the cylinder 198 to unclamp the collet 155 on the spindle 148.

Similarly the pipe 415 is connected with a passage 460 and an elongated arcuate port 461 formed in the valve member 451. In the position of the valve parts (Figs. 32 and 33), fluid passing through the port 461 enters a port 462 in the valve member 450 (Figs. 33 and 52) and passes through a radially extending passage 463 in the valve member 450 and through the flexible pipe 182 (Fig. 52) into the cylinder 197 to unclamp the collet 155 on the spindle 147.

The flexible pipe 181 is connected with a radial passage 466 and a port 465 formed in the valve member 450. Similarly the flexible pipe 180 is connected with a radial passage 468 and a port 467 formed in the valve member 450 (Figs. 33 and 52).

When the cycle control shaft 259 is rotated synchronously to rotate the master cam shaft 430 and to index the work turret frame 130, a rotary motion is imparted to the valve member 450 and also to the cams 407 and 408 to actuate the control valves 405 and 406 respectively so that fluid under pressure is successively admitted to and exhausted from the cylinders 195, 196, 197 and 198 to unclamp and clamp the work collets in the desired and predetermined sequence.

The valve member 451 is provided with annular drainage grooves 472 and 473 (Fig. 32) which are connected with a pipe 474 to exhaust fluid leakage from the valve parts into the reservoir. A compression spring 470 (Fig. 2) surrounds the shaft 131 and serves to exert a pressure toward the left on the valve member 450 to maintain it in operative engagement with the valve member 451.

The master cam shaft 430 (Fig. 37) is supported in bearings 431 and 432 carried by a pair of spaced brackets 433 and 434 which are in turn supported on the work unit base 120. A sprocket 435 (Fig. 34) on the cycle control shaft 259 is connected by a link chain 436 with a sprocket 437 on the master cam shaft 430 to synchronize the rotation of the cycle control shaft 259 and the master cam shaft 430. The cycle control cams 351, 384, 407 and 408 are keyed on the master cam shaft 430. A plurality of control cams 438, 439 and 440 (Fig. 36) are keyed on the cycle control shaft 259. The cams 438, 439 and 440 serve to actuate a plurality of limit switches 442, 441 and 443 respectively. The function of the limit switches 442, 441 and 443 will be hereinafter described.

*Grinding wheel truing apparatus*

It is desirable to provide an automatically actuated truing mechanism which is formed as an integral part of the grinding machine for automatically truing the operative face of the grinding wheel 11 after a predetermined number of work pieces have been ground. It is further desirable to arrange the truing apparatus so that the truing tool may be either reciprocated continuously across the face of the wheel in truing a new grinding wheel under manual control of the operator or may be automatically reciprocated across the face of the wheel once after a predetermined number of valves 156 have been ground. A switch 490 mounted on a control panel 491 (Fig. 56) serves to facilitate setting the truing apparatus for either automatic or continuous truing. The truing apparatus may comprise a vertically extending bracket 492 (Fig. 40) which is fixedly mounted on the front of the wheel slide base 16 (Fig. 40). The truing apparatus therefore is always in a proper position relative to the operative face of the grinding wheel 11 since it moves with the wheel head unit as it is swivelled to predetermined angular positions. An adjustable electric counter is provided for controlling the starting and stopping of the truing cycle after a predetermined number of valves 156 have been ground. When the counter calls for a truing cycle, the work turret frame 130 automatically indexes approximately one half of its normal positioning cycle, thereby to provide clearance to facilitate passing the truing tool across the operative face of the grinding wheel 11.

The truing apparatus is preferably an electrically controlled hydraulically actuated mechanism comprising a cylindrically-shaped slide 495. The slide 495 is arranged to slide within a pair of spaced aligned bearing surfaces 496 and 497 which are supported in fixed relationship with the bracket 492. A hydraulic cylinder 498 is mounted on the bracket 492. The cylinder 498 supports a slidable mounted piston 499 which is connected to one end of a piston rod 500. The other end of the piston rod 500 is connected to a truing tool head 501 by means of a taper pin (Fig. 45). A control valve 502 is provided for controlling the admission to an exhaust of fluid from the cylinder 498. The control valve 502 is actuated by means of a solenoid 503 (Fig. 51). The valve 502 is a piston type valve comprising a valve stem 504 having valve pistons 505, 506 and 507 formed integrally therewith. The valve stem 504 is normally held in a downward position by means of a compression spring 508. A pipe 509 is connected between the valve 502 and a cylinder chamber 510. A cylinder chamber 511 at the other end of the cylinder 498 is connected by a pipe 512 with the valve 502. In the position of the valve 502 (Fig. 51) fluid under pressure passing through the pipe 114 enters a cylinder chamber located between the valve pistons 505 and 506 and passes out through the pipe 509 into the cylinder chamber 510 to move the piston 499 toward the right (Fig. 51). During this movement of the piston 499 fluid within the cylinder chamber 511 exhausts through the pipe 512 into a valve chamber located between the valve pistons 506 and 507, through a passage 513, a pipe 514, an adjustable needle valve 515, a pipe 516 which connects with exhaust pipe 116 to convey exhausting fluid to the reservoir 71.

When the solenoid 503 is energized, the valve stem 504 is moved upwardly against the compression of the spring 508 to shift the position of the valve pistons 505, 506 and 507 so that fluid under pressure within the pipe 114 will enter the valve chamber located between the valve pistons 506 and 507 and pass through the pipe 512 into the cylinder chamber 511 to cause the piston 499 and the piston rod 500 to move toward the left (Fig. 51). During the movement of the piston 499 toward the left, fluid within the cylinder chamber 510 will exhaust through the pipe 509 into the valve chamber located between the valve pistons 505 and 506, through the pipe 514, the needle valve 515 and the pipe 516 into the exhaust pipe 116. It will be readily apparent from the foregoing disclosure that the speed of movement of the piston 499 may be readily controlled by the adjustment of the needle valve 515 to control the rate of exhaust of fluid from the cylinder chambers 510 and 511. The needle valve 515 serves to produce a slow traversing movement of the truing tool across the operative face of the grinding wheel.

In order to eliminate loss of time during truing, it is desirable that the truing tool move rapidly to a position where it engages the face of the grinding wheel at which time the speed of movement is slowed down to the desired truing speed. This is preferably accomplished by providing a second control valve 520 which is actuated by a solenoid 521. The valve 520 is a piston type valve comprising a valve stem 522 having valve pistons 523 and 524 formed integrally therewith. A compression spring 525 serves normally to hold the valve stem 522 in a downward position. As illustrated in Fig. 51, pipe 514 is connected with pipe 526. The pipe 526 is arranged to pass fluid into a valve chamber located between the valve pistons 523 and 524 and out through a pipe 527.

The truing tool head 501 supports a pivotally mounted truing tool holder 531 on a pair of opposed aligned pivot screws 532 and 533 (Figs. 48 and 49). The truing tool holder 531 supports a pair of spaced adjustably mounted diamonds 534 and 535 for truing the operative face 11 and the clearance face 11a of the grinding wheel. A stud 536 is fixedly mounted on the truing tool head 501. The stud 536 passes through a clearance hole formed in the truing tool holder 531. A compression spring 537 surrounds the stud 536 and is inter-opposed between a portion of the truing tool holder 531 and a collar 538 on the stud 536. A nut 539 and a locknut 540 mounted on the stud 536 serve to adjust the compression of the spring 537 so as to maintain the truing tool holder 531 in engagement with a stop screw 541 during a truing operation. The stop screw 541 is screw threaded through a portion of the truing tool head 501. The screw 541 is provided with an actuating knob 542 and a graduated dial 543. An index pointer 544 is fixedly mounted on the truing tool head 501 and is arranged adjacent to the graduated dial 543 to facilitate a precise adjustment of the diamonds 534 and 535. This adjustment of the diamonds serves to take up for diamond wear and also to facilitate initial setting up of the truing apparatus for a given grinding operation.

In order to provide a control for controlling the reciprocation of the truing tool slide 495, an arm 550 is adjustably supported on the slide 495 (Fig. 47). The arm 550 projects from the casing of the bracket 492 which surrounds the truing tool slide and is provided on its front end with an adjustably mounted plate 551. The plate 551 is held in adjusted position on the arm 550 by a pair of spaced screws 552 and 553 which project through elongated slots 554 and 555 respectively formed in the plate 551 and are screw threaded into the forward end of the arm 550. The plate 551 is provided with a rearwardly projecting stud 556 which is arranged to engage an actuating roller 557 or an actuating roller 558 of a limit switch 559 (LS2) or a limit switch 560 (LS3). The limit switch 559 (LS2) is actuated by movement of the truing tool slide 495 at the end of the right to left stroke of the truing tools to de-energize solenoid 503 (Sol. 1) to release the compression of the spring 508 (Fig. 51) so as to reverse the traversing movement of the truing tool. The limit switch 560 (LS3) is actuated by movement of the truing tool slide 495 at the end of the left to right stroke of the truing tool slide 495 to start the cycle motor 251 after a truing operation has been completed.

The truing mechanism above described is arranged automatically after a predetermined number of work pieces have been ground to reciprocate the truing tools 534 and 535 one complete reciprocation across the operative face of the grinding wheel 11.

The plate 551 also supports a block 561 by means of a screw 562 which passes through an elongated slot in the plate 551 and is screw threaded into the block 561. The block 561 is provided with a stud 564 which is arranged to engage the actuating roller 565 of the limit switch 566 (LS4) at about mid-way of the stroke of the truing tool slide 495 in both right to left and left to right passes of the diamonds 534 and 535. Momentary contact of the limit switch 566 (LS4) serves to break a holding circuit on the relay that operates solenoid 73 (Sol. 3) for operating the picker feed mechanism previously described to advance the grinding wheel 11 by one pick of the pawls 51 and 52 during each stroke of the truing tool slide 495.

The plate 551 is provided with a cam 569 which is arranged to engage the actuating roller 567 of a limit switch 568 (LS10) at a point in the traversing movement of the truing tool slide 495 where a change in traverse speed is desired. As previously explained, it is desirable to provide a rapid movement of the truing tools until they are about to engage the operative face of the grinding wheel at which point the traversing speed of the truing tools automatically is reduced to a slow uniform truing speed. This slow speed of the truing tools continues during the movement of the truing tools in both directions. As the truing tool moves out of engagement with the wheel on the return stroke, the traversing speed is again increased to rapidly return the truing tools to their initial or inoperative position. A momentary contact of the limit switch 568 (LS10) serves through a holding circuit to be hereinafter described to energize the solenoid 521 (Sol. 4) to move the valve stem 522 upwardly (Fig. 51) so as to cut off the exhaust of fluid through the pipe 526, so that all fluid exhausting from the truing tool cylinder 498 passes through needle valve 515 thereby reducing the rapid approaching movement of the truing tool to a slow truing speed. Similarly, on the return stroke of the truing tool, momentary contact of the limit switch 568 (LS10) serves to break the holding circuit so as to de-energize solenoid 521 (Sol. 4) thereby releasing the compression of the spring 525 so that fluid exhausting from the truing tool cylinder 498 may pass both through needle valve 515 and may pass unrestricted through the pipe 526 into the pipe 527 thereby changing the slow truing speed of the truing tool slide 495 rapidly to return it to an inoperative position.

Control panel

To facilitate controlling the various mechanisms of the machine, a control panel 491 is fixedly supported on the machine adjacent to the operator's station (Fig. 1). A grinding Wheel Start push button switch 575 is provided for starting the rotation of the grinding wheel driving motor 26. A Stop push button switch 576 is provided for stopping the grinding wheel motor when desired. A Work Start push button switch 577 is provided for starting the motor 205 which drives the work spindles which are mounted on the turret frame 130. A Work Stop push button switch 578 is provided for stopping the work drive motor when desired. A Pump Start push button switch 579 is provided for starting the hydraulic pump driving motor 598 and a coolant pump driving motor 599. A Stop push button switch 580 is provided for stopping the hydraulic pump drive motor 598 and the coolant pump drive motor 599 when desired. A Cycle selector switch 581 is provided which is provided with two stations, namely Automatic and Hand. When the Cycle selector switch 581 is turned to a Hand position, the various mechanisms of the machine will be under manual control of the operator. When the Cycle selector switch 581 is turned to Automatic, the grinding cycle is entirely automatic and functions continuously to successively grind a plurality of valves 156. The automatic cycle will continue to function unless stopped by the operator or through failure of some mechanism of the machine which is arranged so as to automatically stop the cycle of operation. A Cycle Start switch 582 and a Cycle Stop switch 583 are provided for starting and stopping the automatic cycle of operation desired. A Wheel Feed push button switch 584 is provided for advancing the grinding wheel slide by a pick feed mechanism previously described and is utilized in setting up the machine and also for manually advancing the grinding wheel relative to the truing diamond when it is desired to true more than the normal amount from the operative face of the grinding wheel. A Master Stop push button switch 585 is provided to facilitate the stopping of the machine at any time during the operation.

The control panel is also provided with a Loading signal light 586 and Unloading signal light 588 and a Low Pressure signal light 587. These signal lights serve to warn the operator when certain functions of the machine are not functioning properly.

It is desirable to provide a suitable mechanism for automatically stopping the cycle driving motor 251 so that the work turret frame 130 is in a truing position, that is the turret indexed only half way between grinding stations to facilitate passage of the truing tool across the face of the grinding wheel. This mechanism may comprise a plugging switch 590 which is provided with a V-groove pulley 591 (Fig. 34) which is connected by a V-belt 592 with a V-groove 593 formed on the side face of the pulley 254. The plugging switch 590 is supported on a bracket 594 which is adjustably mounted on the end face of the speed reduction unit 256. This plugging switch is actuated to plug the cycle driving motor 251 rapidly to a stopped condition to position the work turret for a truing operation.

As shown in Fig. 1, a motor 598 is provided for driving the hydraulic pump 112. A motor 599 is provided for driving a coolant pump motor (not shown) for supplying coolant fluid to the grinding wheel 11 and the work pieces 156 during a grinding operation.

It is desirable to provide a suitable mechanical device for stopping the machine in case of a mechanical overloading of the machine. In case any mechanism of the machine jams due to failure to properly function, an overload clutch 601 is keyed on the shaft 255 (Fig. 34). The teeth of the clutch 601 engage clutch teeth formed on the pulley 254. The pulley 254 is free to rotate on a bushing which is mounted on the shaft 255. A compression spring 602 is interposed between a shoulder on the clutch member 601 and a collar 603 which is adjustably mounted on the shaft 255. The compression of the spring 602 may be adjusted by means of the collar 603 so that during normal functioning of the mechanisms of the machine the clutch 601 will be maintained in operative engagement to drive the pulley 254. In case of a mechanical overloading, continued rotation of the pulley 254 by means of the cycle drive motor 251 will cam the clutch 601 to a dis-engaged position. During this movement, the clutch member 601 will engage the actuating roller 604 of the limit switch 605 to actuate the limit switch and thereby to shut down the machine by stopping the motors 26, 205, 598, 599 and 251.

Electrical controls

The electrical control apparatus has been illustrated in Figs. 53, 54 and 55 which when arranged vertically end to end show an elementary wiring diagram of the electrical control apparatus. Power is conveyed through the power lines L1, L2 and L3 to drive the grinding wheel driving motor 26, the work spindle driving motor 205, the hydraulic pump driving motor 598, the coolant pump driving motor 599 and the cycle driving motor 251. The power lines L1 and L3 supply current to the primary of a transformer 609. The secondary of the transformer 609 (Fig. 53) supplies current through lines X1 and X2 for the control circuits.

A safety limit switch 608 (LS11) is actuated by movement of the wheel slide when the grinding wheel is worn to a minimum usable diameter and requires replacement to stop the electric motors 26, 205, 598, 599 and 251.

As shown in Figs. 53 and 54, MW and OLW are the coil and overloads respectively of a standard across-the-line magnetic starter which operates the wheel drive motor 26.

MH and OLH are the coil and overloads respectively of a standard magnetic across-the-line type starter which controls the headstock motor 205.

MC and OLC are the coil and overloads respectively of a standard magnetic across-the-line type starter which controls the coolant pump motor 599.

MP and OLP are the coil and overloads respectively of a standard magnetic across-the-line type starter which controls the hydraulic and lubrication pumps motor 598.

MY and OLY are the coil and overloads respectively of a standard magnetic across-the-line type starter which controls the cycle driving motor 251.

With cycle selector switch 581 set for Hand and the truing selector switch 490 set for Automatic, operation is as follows:

Pressing Start button 582 (Figs. 54 and 56) energizes momentarily relay CRT which in turn energizes under voltage relay UV. Relay UV is maintained energized through holding interlock UV. CRT also energizes the clutch coil of the counter (Fig. 55) which is maintained energized through its holding interlock T. Energizing the clutch coil of the counter closes interlock TR. Relay CRD is energized at the same time by limit switch 560 (LS3). Energizing of relay CRD energizes line contactor MY for the cycle drive motor 251, relay CRM and relay CRA which is maintained energized through its holding interlock CRA and interlock CRB. Starting of the cycle drive motor 251 closes plugging switch contact 590. The work spindle turret frame 130 revolves and on each revolution actuates limit switch (443) LS1 which energizes the actuating coil of the counter. When the actuating coil of the counter has been energized the same number of times as set on the counter, interlock CRT of the counter opens and de-energizes line contactor MY. The closing of the normally closed interlock of the contactor MY energizes the plugging contactor PY and relay CRP. The cycle drive motor 251 decelerates to zero speed at which time plugging switch interlock 590 opens and removes power from the cycle drive motor 251. Deenergizing of both the plugging contactors CRP and line contactor CRM energizes solenoid Sol. 1 (503) which starts the truing tool slide device rapidly traversing from right to left. The movement of the truing tool slide 495 from right to left de-actuates limit switch LS3 (560) de-energizing relay CRD which in turn energizes relay CR2. Energizing relay CR2 energizes solenoid Sol. 2 (107) to stop the reciprocation of the wheel spindle 12. When truing tool slide 495 reaches point where truing traverse speed is required, limit switch LS10 (568) is actuated momentarily energizing relay CRN which in turn energizes relay CRF. The relay CRF is maintained energized through its holding interlock CRF. Energizing relay CRF energizes solenoid Sol. 4 (521) to change the traverse speed from rapid traverse to a slow truing traverse speed. The truing tool slide 495 continues to traverse at truing speed across the grinding wheel 11 until right to left stroke is completed at which time limit switch LS2 (559) is actuated. Actuating limit switch LS2 (559) energizes relay CR3 which energizes solenoid Sol. 3 (73) to obtain one pick feed of the grinding wheel 11 into the truing diamonds 534 and 535. The normally closed interlock of limit switch LS2 (559) opens and de-energizes relay CRB which breaks the holding circuit on relay CRA. The de-energizing of relay CRS de-energizes relay CR1 which de-energizes solenoid Sol. 1 (503) to start traverse of the truing tool slide 495 from left to right. The truing tool slide 495 traverses at a truing speed because solenoid Sol. 4 (521) remains energized. When the truing tool slide 495 again reaches the right hand edge of the grinding wheel 11 it actuates limit switch 10 (LS10) energizing relay CRN which energizes relay CRK which is maintained energized through its holding interlock CRK. Energizing relay CRK de-energizes relay CRF which de-energizes solenoid Sol. 4 (521) and traverses the truing tool slide 495 at a rapid traverse rate until left to right hand stroke is completed at which time limit switch LS3 (560) is actuated. Actuating limit switch LS3 (560) energizes relay CRD which de-energizes relay CR2 de-energizing solenoid Sol. 2 (107) to allow the wheel spindle 12 to reciprocate. De-energizing relay CR2 energizes the clutch of the counter to again start the cycle.

Holding interlock CR3 is used with relay CR3 in order to energize solenoid Sol. 3 (560) for a length of time sufficient to allow the picker feed of the grinding wheel to operate. The use of this holding circuit necessitates the addition of limit switch LS4 (565) whose only function is to break the holding circuit of relay CR3 at some point in the truing tool slide 495 traverse after each pick feed of the grinding wheel 11 into the diamond.

With truing selector switch 490 set on Continuous, relays CR4 and CRX are energized. One normally closed interlock of CRX prevents the clutch of the counter from being energized and therefore prevents the turret from rotating. One interlock of CRX energizes CR2 energizing solenoid Sol. 2 (107) to stop the reciprocation of the wheel spindle. One interlock of CRX is placed in series with a normally open interlock of relay CRD in the coil circuit of relay CRA. When the truing tool slide 495 reaches the end of its left to right circuit limit switch (LS3) 560 is actuated energizing relay CRD which in turn energizes relay CRA which in turn energizes relay CR1 energizing solenoid Sol. 1 (503) to start the right to left stroke of the truing tool slide 495. This circuit allows the truing tool slide 495 to traverse continuously until the truing selector switch 490 is rotated to the automatic position. During continuous truing of the grinding wheel 11, the wheel may be fed manually into the diamond by the feed button 584 which energizes relay CR3 energizing solenoid Sol. 3. (73) for the feed movement.

When the cycle selector switch 581 is rotated to the Hand position, relay CRY is de-energized. Also one pole of the selector switch 581 prevents relay CR1 from becoming energized and thus prevents the traverse of the truing tool slide 495. De-energizing relay CRY shorts out the counter interlock RT and allows limit switch LS5 to control the stopping of the work spindle turret frame 130. When the turret is rotating, the cam actuated limit switch LS5 and line contactor MY are de-energized and plugging contactor PY is energized stopping the cycle drive motor 251 in the set-up position of the turret.

Operation

The operation of this improved grinding machine will be readily apparent from the foregoing disclosure. Assuming the mechanisms of the machine have been previously set up and adjusted for grinding the valve faces 157 of the valves 156, and the cycle selector switch 581 to be set for a Automatic cycle and the truing switch 490 also set for Automatic operation, the automatic cycle of the machine may be then started by pressing the Cycle Start push button 582. Before starting the grinding cycle, push button Start switch 575 is actuated to start the grinding wheel driving motor 26, the push button Start switch 577 is actuated to start the work spindle driving motor 205 and the pump Start push button switch 579 is actuated to start the hydraulic and coolant pumps. The closing of the switch 582 starts the automatic operation of the machine, the work turret frame 130 is successively and automatically indexed to present successive valves 156 into a position for grinding, rocks the turret supporting frame to feed the valve 156 being ground toward and from the grinding wheel 11 to grind the valve face to the desired and predetermined extent. The valves 156 are loaded either manually or automatically into the loading chute above described and are automatically loaded into the work spindle which is in a loading position. The valves are loaded into the spindle while the spindle remains stationary. During the loading operation another valve previously ground is automatically withdrawn from its supporting spindle. This cycle of operation continues until the predetermined number of valves 156 have been ground after which the electric counter (Fig. 55) which has been given a predetermined number of impulses, one for each rotation of the work turret frame 130, serves to position the work turret frame 130 in a half-way indexed position for automatically truing the operative face of the grinding wheel in a manner before described. After the truing operation has been completed, the grinding cycle is again resumed and a plurality of valves 156 are ground after which another truing operation of the wheel is automatically effected. The automatic cycle of the machine continues until the operator manually actuates the Cycle Stop button 583 to shut down the machine or actuates the Master Stop switch 585 which serves to stop all of the driving motors in case an emergency shut down is required.

It is desirable that the extent of infeeding movement of the turret 130 be adjustable without changing the final or finish grinding position of the turret 130. The parts are arranged so that when the feed cam 235 is in a final or finish grinding position, the plane surface 243 is in a horizontal position. In this position of the parts, the roller 237 may be adjusted relative to the frame 136 to vary the effective length of the short arm of the lever 230 and thereby varying the extent of infeed without changing the final or finish grinding position of the turret 130.

In setting up the machine, valves 156 to be ground are loaded into the turret chucks. The Cycle selector switch 581 is turned to Hand which causes the turret 130 to stop with the feed cam 235 in position so that a chuck and valve 156 to be ground are in a forward or final grinding position. In this position of the parts, the screw 223 may be manually rotated to feed the work unit base, the turret frame 130 and valve 156 toward the grinding wheel 11 to grind the face 157 of the valve 156 to a predetermined size. The Cycle selector switch 581 is then turned to Automatic and the Cycle Start switch 582 is actuated to start the automatic grinding cycle. Successive valves 156 are then automatically fed into the turret 130, automatically indexed to a grinding position, then ground to a predetermined size, and thereafter automatically unloaded. The automatic cycle continues until the cycle is stopped by actuation of the Cycle Stop switch 583.

We claim:

1. In a grinding machine having a base, a transversely movable slide on said base, a rotatable grinding wheel thereon, a feed mechanism for adjusting said slide transversely, a work unit including a movably mounted frame, a rotatable turret on said frame having a plurality of spindles, each of said spindles having a work supporting chuck, means including a motor to rotate said spindles, a cycle control unit automatically and intermittently to index said turret successively to position said spindles in a grinding position, and means including a rotatable cam actuated by the cycle control unit to move said frame so as to impart a transverse feeding movement to said turret relative to the grinding wheel to grind successive work pieces to a predetermined size.

2. In a grinding machine having a base, a transversely movable slide on said base, a rotatable grinding wheel thereon, means including a nut and screw feed mechanism to adjust said slide transversely, a work unit including a pivotally mounted frame, a rotatable turret on said frame having a plurality of work supporting and rotating spindles, means including a motor to rotate said spindles, a cycle control unit to index said turret successively to position said spindles in a grinding position, said means including a cam actuated by the cycle control unit to rock said frame so as to impart a transverse feeding movement to said turret relative to the grinding wheel to grind successive work pieces to a predetermined size.

3. In a grinding machine as claimed in claim 2, in combination with the parts and features therein specified of a truing apparatus including a longitudinally movable slide, a truing tool adjustably mounted on said slide, a hydraulic piston and cylinder to reciprocate said slide, a solenoid-actuated control valve therefor, and an electric counter actuated in timed relation with rotation of the work turret to actuate said valve so as to initiate a truing cycle after a predetermined number of work pieces have been ground.

4. In a grinding machine as claimed in claim 2, in combination with the parts and features therein specified of a truing apparatus including a longitudinally movable slide, a truing tool adjustably mounted on said slide, a piston and cylinder to reciprocate said slide, a solenoid-actuated control valve therefor, an electric counter actuated in timed relation with rotation of the work turret to actuate said valve so as to initiate a truing cycle after a predetermined number of work pieces have been ground, and means including a plugging switch to stop the turret driving motor when the turret is in a halfway indexed position during a truing operation.

5. In a grinding machine as claimed in claim 2, in combination with the parts and features therein specified in which the feed mechanism further includes pawl and ratchet mechanism to feed side wheel slide, a solenoid-actuated hydraulic mechanism to actuate said pawl and ratchet to impart a one-pick feed to said slide, a truing apparatus including a reciprocable slide having a truing tool, and means including a limit switch actuated by the transversing movement of the truing tool slide to energize said solenoid and thereby impart an infeed to the grinding wheel relative to the truing tool before each pass of the truing tool across the operative face of the grinding wheel.

6. In a grinding machine as claimed in claim 2, in combination with the parts and features therein specified of a feeding mechanism including a cam actuated by the cycle control unit, a pivotally mounted lever, one arm of which is actuated by said cam, an adjustable roller on said frame which is arranged to engage the other arm of said lever, and means to adjust the position of the roller relative to the frame so as to vary the extent of feeding movement imparted by the cam to the frame and turret.

7. In a grinding machine as claimed in claim 2, in combination with the parts and features therein specified of a feeding mechanism including a cam actuated by the cycle control unit, a pivotally mounted lever on said base, said lever having a long arm which is actuated by said cam, an adjustable roller on said frame which is arranged to engage a short arm of said lever and means to adjust the position of the roller relative to the frame so as to vary the effective length of the short arm of the lever and thereby to vary the extent of feeding movement imparted to the frame and turret.

8. In a grinding machine having a base, a transversely movable wheel slide, a rotatable grinding wheel thereon, means to adjustably swivel said wheel slide to facilitate grinding a frusto-conical face on a work piece, a pivotally-mounted transversely-movable rotatable work turret, a plurality of work spindles thereon, means including a geneva mechanism to index said turret successively to position said spindles in grinding-unloading-loading and idle positions, means including a motor to rotate said spindles when in a grinding positon, and work loading chute, means including an automatically actuated loading plunger to load successive work pieces from said chute into said spindles when in a loading position, and means automatically to withdraw ground work pieces from the spindles when in an unloading position.

9. In a grinding machine having a base, a rotatable grinding wheel thereon, a work unit including a pivotally mounted frame, a rotatable turret on said frame having a plurality of spindles, each of said spindles having a work supporting collet, spring actuated means for closing said collets, a hydraulic piston and cylinder for opening said collets, means including a motor to rotate said spindles and collets, a cycle control unit to index said turret successively to position said spindles in a grinding position, means including a cam actuated by the cycle control unit to rock said frame and so as to impart a transverse feeding movement of the turret toward and from the grinding wheel to grind successive work pieces to a predetermined size, and means including a valve actuated by and in timed relation with the indexing movement of said turret successively to admit fluid under pressure to said cylinders to open said collets.

10. In a grinding machine as claimed in claim 9, in combination with the parts and features therein specified of fluid connections between said control valve and said rotary pilot valve, and fluid connections between said rotary pilot valve and the collet actuating cylinders on said turret which are arranged automatically to unclamp said collets when in an unloading and loading position.

11. In a grinding machine as claimed in claim 9, in combination with the parts and features therein specified of fluid connections between said control valve and said rotary pilot valve, and fluid connections between said rotary pilot valve and the collet actuating cylinders on said turret automatically to control the clamping and unclamping of said work collets in timed relation with the indexing movement of said turret.

12. In a grinding machine having a base, a transversely movable slide and rotatable grinding wheel thereon, a pivotally-mounted transversely-movable rotatable work turret, a plurality of work spindles on said turret, said work spindles each having a work collet, means to index said turret successively to position said spindles in grinding-unloading-loading and idle positions, means including a motor to rotate said spindles when in a grinding position, a work loading chute, a work transfer means to move a work piece from said chute into axial alignment with said collets when in a loading position, means including a hydraulically operated loading plunger to move successive work pieces into said spindles when in a loading position, and means automatically to withdraw ground work pieces from said spindles when in an unloading position.

13. In a grinding machine as claimed in claim 12, in combination with the parts and features therein specified of a hydraulic piston and cylinder to reciprocate said loading plunger, a control valve therefor, an automatically actuated work discharge member, a hydraulic piston and cylinder to reciprocate said work discharge member, a control valve therefor, a cycle control unit including a motor, said motor being connected to actuate a turret indexing mechanism, and a plurality of cams driven by said unit motor to actuate said control valves so as to cause a reciprocation of the work loading plunger and the work discharge member in timed relation with the indexing movement of the turret.

14. In a grinding machine as claimed in claim 12, in combination with the parts and features therein specified of a reciprocable work discharge member, cycle control unit including a motor, said motor being connected to actuate the turret indexing mechanism, a limit switch actuated by the work loading plunger to render the cycle motor inoperative until the loading plunger has completed a loading operation, and a limit switch actuated by the work discharge member to render the cycle motor inoperative until the discharge member has completed an unloading operation.

15. In a grinding machine as claimed in claim 12, in combination with the parts and features therein specified of a cycle control unit including a motor, an indexing mechanism actuated by said motor to control the indexing movement of said turret, a limit switch actuated by the work loading plunger to render the cycle motor inoperative until the loading plunger has completed a loading operation, a limit switch actuated by the discharge member to render the cycle motor inoperative until the discharge member has completed an unloading operation, and a safety limit switch actuated by a work piece unless it is completely discharged from the collet to render the cycle motor and the turret indexing mechanism inoperative.

16. In a grinding machine having a base, a rotatable grinding wheel thereon, a pivotally-mounted transversely-movable rotatable work turret, a plurality of symmetrically arranged work spindles on said turret, said spindles being arranged so that in an indexed position of the turret the spindles are positioned in grinding-unloading-loading and idle positions, means including a motor to rotate said spindles when in grinding and idle positions, a cycle control unit including a motor, a geneva-movement driven thereby to index said turret, and means including an adjustably arranged cam mechanism driven by the cycle control motor to impart a rocking movement to said turret to grind a work piece to a predetermined size.

17. In a grinding machine as claimed in claim 16, in combination with the parts and features therein specified of a plurality of cams driven by said cycle motor, a control valve actuated by one of said cams to control the actuation of a work loading plunger successively to load work pieces into said spindles when in a loading position, and a second control valve actuated by one of said cams to control the actuation of a work discharge member successively to unload ground work pieces from said spindles when in an unloading position.

18. In a grinding machine having a transversely movable rotatable grinding wheel, means including a solenoid-actuated pawl and ratchet feed mechanism to impart a one-pick feed to said wheel, a rotatable turret having a plurality of work spindles, a cycle control unit including a motor, an indexing mechanism actuated by said motor to index said turret, a reciprocable truing tool slide, a piston and cylinder to reciprocate said slide, a solenoid-actuated valve to control the admission to and exhaust of fluid from said cylinder, a second solenoid valve to control the exhaust of fluid from said cylinder to facilitate slowing down the rapid traverse of the truing tool slide to a slow truing speed, and an electric counter actuated by rotation of said turret to actuate the first solenoid control valve after a predetermined number of work pieces have been ground to initiate a truing operation.

19. In a grinding machine as claimed in claim 18, in combination with the parts and features therein specified of a limit switch actuated by and in timed relation with the reciprocation of the truing tool to actuate said second solenoid valve to change a rapid traversing movement of the truing tool to a slow truing speed as the truing tool moves into engagement with the grinding wheel, and a second limit switch actuated by and in timed relation with the reciprocation of the truing tool to actuate said first solenoid valve to reverse the traversing movement of the truing tool slide.

20. In a grinding machine as claimed in claim 18, in combination with the parts and features therein specified of a limit switch actuated by and in timed relation with the reciprocation of the truing tool to actuate said second solenoid valve to change a rapid traverse of the truing tool slide to a slow truing speed as the truing tool moves into engagement with the grinding wheel, a second limit switch actuated by and in timed relation with the reciprocation of the truing tool to actuate the first solenoid control valve to reverse the traversing movement of the truing tool slide when the truing tool has completed a pass across the face of the grinding wheel, and another limit switch actuated by and in timed relation with the reciprocation of the truing tool to actuate said solenoid actuated pawl and ratchet feed mechanism to impart a one-pick feed of the grinding wheel before each pass of the truing tool across the face of the grinding wheel.

21. In a grinding machine as claimed in claim 18, in combination with the parts and features therein specified of a limit switch actuated by and in timed relation with the reciprocation of the truing tool to actuate said second solenoid valve to change a rapid traverse of the truing tool slide to a slow truing speed as the truing tool moves into engagement with the grinding wheel, a second limit switch actuated by and in timed relation with reciprocation of the truing tool to actuate said first solenoid valve to reverse the traversing movement of the truing tool slide after the truing tool has completed one pass across the face of the grinding wheel, a limit switch actuated by and in timed relation with the reciprocation of the truing tool to actuate the solenoid-actuated pawl and ratchet feed mechanism to impart a one-pick feed of the grinding wheel before each pass of the truing tool across the face of the grinding wheel, and another limit switch actuated by and in timed relation with the reciprocation of the truing tool to start the cycled drive motor after one complete reciprocation of the truing tool across the face of the grinding wheel.

22. In a grinding machine having a base, a rotatable grinding wheel thereon, a work unit including a rotatable turret having a plurality of work supporting and rotating spindles, means including a motor on said unit to rotate said spindles, a cycle control unit including an independent motor, a geneva-indexing mechanism actuated by said latter motor to index said turrent successively to position said spindles in a grinding position, said geneva mechanism including a slotted plate, a plurality of index notches in said plate, a cam-actuated pawl arranged to engage one of said notches after each indexing movement precisely to locate said turret in indexed positions and means to adjust the position of said pawl to facilitate a precise adjustment of the indexed positions of said turret.

23. In a grinding machine having a base, a rotatable grinding wheel thereon, a transversely adjustable slide on said base, a work unit on said slide including a rotatable turret having a plurality of work supporting and rotating spindles, means including a motor on said unit to rotate said spindles, a cycle control unit including an independent motor on said slide, a geneva-indexing mechanism actuated by said latter motor to index said turret successively to position said spindles in a grinding position, said geneva mechanism including a slotted plate, a plurality of index notches in said plate, a pivotally mounted arm on said unit, an adjustably mounted pawl on said arm to engage said notches when the turret is in an indexed position, and a cam actuated in timed relation with the geneva mechanism to actuate said pawl in timed relation with the turret indexing movement and means precisely to adjust the position of said pawl on said arm to facilitate adjustment of the indexed positions of the turret.

24. In a grinding machine having a base, a rotatable grinding wheel thereon, means to feed the grinding wheel transversely, a work unit including a pivotally mounted frame, a rotatable work turret on said frame having a plurality of work spindles, means including a motor to rotate said spindles, a cycle control unit intermittently to index said turret successively to position said spindles, means including a cam actuated by the cycle control unit, a pivotally mounted lever, a long arm of said lever being actuated by said cam, a short arm on said lever having a plane upper surface arranged in a horizontal position when the cam is in a forward feed position, an adjustable roller on said frame which engages said plane surface, and means to adjust the position of said roller relative to the frame so as to vary the extent of feeding movement without changing the final forward position of the turret.

25. In a grinding machine having a base, a rotatable grinding wheel thereon, a work unit including a rotatable turret having a plurality of work supporting spindles, means including a motor to rotate said spindles, means to index said turret, means to cause a relative transverse feeding movement between the turret and the grinding wheel, an automatically actuated work loading plunger to load successive work pieces into said spindles, and an automatically actuated hollow work discharge member automatically to withdraw ground work pieces from said spindles when in an unloading position.

26. In a grinding machine as claimed in claim 25, in combination with the parts and features therein specified of a slotted rubber disk enclosing one end of said work discharge sleeve, a central hollow in said disk, and means automatically to reciprocate said sleeve to discharge work pieces from said spindles when in an unloading position, said disk being arranged to flex over a work piece when moved in one direction and to grip and eject said work piece from the spindle when moved in the opposite direction.

CARL G. FLYGARE.
CHARLES C. ALVORD.
WILLIAM L. DROWN.

REFERENCES CITED

The following references are of record in the file of this patent:

UNITED STATES PATENTS

| Number | Name | Date |
| --- | --- | --- |
| 1,516,103 | Keller | Nov. 18, 1924 |
| 1,888,710 | Arter et al. | Nov. 22, 1932 |
| 1,916,916 | Booth | July 4, 1933 |
| 2,003,269 | Arter et al. | May 28, 1935 |
| 2,028,642 | Arter et al. | Jan. 21, 1936 |
| 2,035,737 | Binns et al. | Mar. 31, 1936 |
| 2,108,310 | Griffing | Feb. 15, 1938 |
| 2,224,265 | Johnson et al. | Dec. 10, 1940 |
| 2,364,804 | Montgomery et al. | Dec. 12, 1944 |
| 2,436,561 | Flygare et al. | Feb. 24, 1948 |